US006711949B1

(12) United States Patent
Sorenson

(10) Patent No.: US 6,711,949 B1
(45) Date of Patent: Mar. 30, 2004

(54) REMOTE FLUID LEVEL DETECTION SYSTEM

(75) Inventor: Chad Michael Sorenson, Blaine, MN (US)

(73) Assignee: Fluent Systems, LLC, Madison, WI (US)

(*) Notice: Subject to any disclaimer, the term of this patent is extended or adjusted under 35 U.S.C. 154(b) by 0 days.

(21) Appl. No.: 10/061,506

(22) Filed: Feb. 1, 2002

Related U.S. Application Data

(60) Provisional application No. 60/265,317, filed on Feb. 1, 2001.

(51) Int. Cl.[7] ............................................. G01F 23/38
(52) U.S. Cl. ......................... 73/313; 73/313; 73/305; 73/317; 73/314; 340/623
(58) Field of Search ........................ 340/623; 73/313, 73/305, 317, 314

(56) References Cited

U.S. PATENT DOCUMENTS

| 2,795,955 | A |   | 6/1957  | Hall |
| 4,554,494 | A |   | 11/1985 | Howeth |
| 4,688,028 | A |   | 8/1987  | Conn |
| 4,911,011 | A |   | 3/1990  | Fekete et al. |
| 4,987,400 | A |   | 1/1991  | Fekete |
| 5,000,044 | A | * | 3/1991  | Duffy et al. ................. 73/317 |
| 5,023,806 | A |   | 6/1991  | Patel |
| 5,072,618 | A |   | 12/1991 | Taylor et al. |
| 5,154,079 | A |   | 10/1992 | Lupoli |
| 5,189,911 | A |   | 3/1993  | Ray et al. |
| 5,305,639 | A |   | 4/1994  | Pontefract |
| 5,357,815 | A |   | 10/1994 | Williamson |
| 5,374,790 | A |   | 12/1994 | Horvath |
| 5,399,875 | A |   | 3/1995  | Crowne |
| 5,410,913 | A |   | 5/1995  | Blackburn |
| 5,435,181 | A |   | 7/1995  | Koebernik |
| 5,479,820 | A |   | 1/1996  | Fekete |
| 5,530,258 | A |   | 6/1996  | Crowne |
| 5,619,560 | A |   | 4/1997  | Shea |
| 5,627,380 | A |   | 5/1997  | Crowne |
| 5,627,523 | A |   | 5/1997  | Besprozvanny et al. |
| 5,642,097 | A |   | 6/1997  | Martel |
| 5,708,424 | A |   | 1/1998  | Orlando et al. |
| 5,723,870 | A |   | 3/1998  | Crowne et al. |
| 5,814,830 | A |   | 9/1998  | Crowne et al. |
| 5,826,459 | A | * | 10/1998 | Kataoka et al. ........... 73/290 R |
| 6,041,650 | A |   | 3/2000  | Swindler et al. |
| 6,089,086 | A |   | 7/2000  | Swindler et al. |
| 6,170,328 | B1|   | 1/2001  | Ross, Jr. et al. |
| 6,199,428 | B1|   | 3/2001  | Estevez-Garcia et al. |
| 6,216,534 | B1|   | 4/2001  | Ross, Jr. et al. |
| 6,253,609 | B1|   | 7/2001  | Ross, Jr. et al. |
| 6,289,728 | B1| * | 9/2001  | Wilkins ....................... 73/149 |
| 6,289,731 | B1|   | 9/2001  | Lo |
| 6,336,362 | B1| * | 1/2002  | Duenas ....................... 73/313 |
| 6,564,632 | B2|   | 5/2003  | Ross, Jr. |

* cited by examiner

Primary Examiner—Hezron Williams
Assistant Examiner—André K. Jackson
(74) Attorney, Agent, or Firm—Michael Best & Friedrich LLP; Grady J. Frenchick; Jeffrey D. Peterson

(57) ABSTRACT

A remote two-module electronic fluid monitoring system to be used as an agricultural aid in the application of a fluid to a field. A tank module sits atop a field tank and monitors internal fluid level. Fluid level detection is achieved by tracking the position of an embedded permanent magnet associated with a given internal fluid level within an existing float gauge mechanism. An integrated circuit capable of precisely detecting the orientation of magnetic fields senses the angular position of an existing magnet and outputs an angular field reading to an interfaced microcontroller which then translates angular reading to fluid level. The tank module contains a radio frequency transmitter which then sends fluid level information to a display module mounted within the tractor cab. The display module receives the signal from the tank module and reports to the user the present fluid level remaining in tank via a liquid crystal display.

41 Claims, 23 Drawing Sheets

REMOTE FLUID LEVEL DETECTION SYSTEM

CROSS-REFFERANCE TO RELATED APPLICATIONS

This application claims the benefit of the filing date of U.S. Provisional Application No. 60/265,317.

BACKGROUND OF INVENTION

This invention relates to a remote fluid level detection system. The system uses magnetic detection to determine the fluid level in a confined vessel. Suitably, the invention is utilized with anhydrous ammonia field tanks.

Anhydrous ammonia ($NH_3$) is a substance used in agriculture as a fertilizer because of its high nitrogen content. Typically, anhydrous ammonia is applied to fields in the fall after the crop has been harvested to replenish the nutrients for the next season. The application of anhydrous ammonia involves the use of a field tractor, a field implement that is pulled behind the tractor and a large anhydrous ammonia tank that is pulled behind the implement. This creates a relatively long, train-like configuration of machinery.

Anhydrous ammonia is a multi-phase chemical that, when stored under pressure in the field tank, is in the liquid phase. Upon application, the fertilizer is injected into the topsoil, and it undergoes a phase transformation while percolating through the soil in a gaseous state. Since anhydrous ammonia is a hazardous material, and needs to be stored under pressure, the field tanks are made of heavy gauge steel; much like propane tanks for remote residential use. As a result, fluid level inside the tank is not visible and a special measurement device is needed to indicate fluid level remaining in the tank.

Many existing fluid level sensing systems make use of a magnetic float gauge assembly. Such an assembly comprises an aluminum float-arm that pivots about the center of the tank (See U.S. Pat. No. 2,795,955, incorporated herein by reference). As fluid level changes within the tank, the buoyancy of the anhydrous ammonia affects the position of the internal float. The arm is mechanically coupled via bevel gears to a vertical shaft that runs to the top of the holding tank. Fluctuations in the position of the internal float translate to a small angular rotation of the vertical shaft. To keep the tank completely sealed, a permanent magnet is attached to the top of the vertical shaft. On the outside of the tank, a simple local compass, with fluid level markings, then tracks the position of the internal magnet. In this way, the fluid level of the anhydrous ammonia tank is made visible to the farmer without creating any opportunity for leaks since there are no through-holes or seals needed for the tank gauge to function.

This type of gauge system, however, has many shortcomings. When the farmer is applying the anhydrous ammonia, the fluid level inside the tank is not known because the size and orientation of the gauge face render it completely unreadable from the cab of the tractor. This situation makes it necessary for the farmer to periodically stop application of anhydrous ammonia, get out of the tractor, and walk forty feet back to the field tank to read the small dial on the top of the tank. A standard 1450 gallon anhydrous ammonia field tank is sufficient for only 40 acres of farmland, so this tedious task of determining the fluid level as the tank reaches empty is a recurring annoyance that results in degraded time efficiency.

Another shortcoming of the prior system, is that the total amount of dispensed ammonia is not accurately known until the tank has been emptied. When the tank has been emptied, the farmer can finally approximate the total acreage covered by one full tank, and thus the application rate per acre.

The need exists, therefore, for a means by which fluid level may be known to the farmer on a continuous basis from within the tractor cab during the application process.

SUMMARY OF INVENTION

The present invention relates to a remote fluid level detection system which provides information to the user, in a wireless fashion, on the fluid level of a towed tank. The present invention is suitably designed for use with a tank containing anhydrous ammonia, but can be practiced with any tank containing fluid and a magnetic float gauge assembly.

Fluid level information is available on a continuous basis as fluid application is occurring. This eliminates the current need to stop application to physically read the existing gauge mechanism on the field tank.

The invention is composed of two electronic modules, a tank module and a display module, that communicate with each other by wireless means, namely a radio frequency transmission.

The tank module is affixed atop the existing mechanical gauge mechanism on a towed field tank, and utilizes a magnetic detection scheme to sense the orientation of a local magnetic field produced by the embedded magnet of the float gauge assembly. The position of the embedded magnet corresponds with the fluid level within the tank.

Due to the hazardous nature of anhydrous ammonia, the application and storage of the fluid is a closely controlled process by various industrial and government agencies. Therefore, a fluid sensing means which would require any modifications to the existing tank would require lengthy testing and approval requirements. The present invention does not require any modifications or removal of any existing hardware and therefore is a completely safe and easy to use fluid level detecting system that does not adversely affect the performance and safety of the original system. The means by which magnetic detection is achieved in the present invention is sufficiently sensitive to eliminate the need for removal or modification of the existing gauge face on an anhydrous ammonia tank.

The tank module physically covers the existing gauge mechanism. A small liquid crystal display on the tank module indicates the percentage of fluid remaining. This liquid crystal display may be incorporated into the tank module at a vertical orientation, to provide much easier viewing of internal fluid level.

The tank module is quickly and easily installed to existing fluid measurement hardware on a tank by the use of a quick-release mechanical system, which captures the head of the existing gauge firmly and without the use of any tools. This allows for the tank module to easily be moved from tank to tank with very little effort and time.

The tank module is designed to accommodate a number of possible mechanical gauge configurations found on a tank, such that various bolt patterns and gauge head geometries will interface equally well with the tank module. The geometric constraints of the tank module limit the orientation by which the invention may be installed to two distinct orientations: an orientation aligned with the magnetic sensing element, and an orientation 180 degrees offset from the magnetic sensing element. In the event the tank module is installed on the existing gauge mechanism 180 degrees offset from the orientation of the internal magnetic sensing element, the control firmware identifies this misalignment and resets the internal origin to compensate for this misalignment, such that the invention will operate equally well in either one of the two mounting orientation possibilities.

Prior fluid level detection gauges utilizing magnetic fields often do so as a means to merely detect low fluid levels or to detect fluid levels at one of several discrete fluid levels. The present invention utilizes a magnetic detection scheme that permits much higher resolution and therefore a much more precise indication of internal fluid level over a continuum between "full" and "empty." The capability of more precisely monitoring fluid levels using this magnetic detection scheme may then be used in conjunction with other inputs to output secondary information that would not have previously been possible.

Within the tank module, a microcontroller based electronic circuit detects the orientation of the magnetic field being generated by the permanent magnet inside the existing gauge mechanism. This magnetic orientation detection is accomplished by utilizing a magnetic sensor. The magnetic sensor is capable of interfacing with the microcontroller within the tank module and reports the orientation of the magnetic field to one degree of precision or better. This allows the microcontroller to locate precisely the position of the embedded tank magnet, and consequently the corresponding internal fluid level. Data stored in an internal look-up table within the tank module microcontroller is referenced to translate the magnetic field orientation reading to a usable fluid level value that corresponds with a percentage of fluid remaining in the tank.

The tank module is equipped with a radio frequency (RF) transmitter that encodes the resulting fluid level data, and transmits it in a wireless fashion to the display module mounted inside the tractor cab. The display module receives the signal from the tank module, decodes the information and utilizes this information for a number of purposes.

Information on the current fluid level can be directly conveyed to the user within the tractor cab via a visible liquid crystal display in the display module. Additionally, a "tank low" audible alert is included in the system to notify the user when fluid level has dropped beneath a certain threshold.

The display module includes a means by which it can interface with the tractor's electronic groundspeed indicator, thereby providing information to the display module on the tractor's rate of travel through the field. The display module also permits the user to input information on the size of the anhydrous ammonia field tank and the width of the field implement.

Information from the tank module on current fluid level is combined with information on the tractor's groundspeed, information on the anhydrous ammonia tank size, and information on the width of the field implement, to provide useful secondary information. The width of the field implement information is multiplied by the tractor's groundspeed on a time-basis to monitor and store total acreage covered for any given tank. Fluid level information is also monitored and stored on a time basis, such that a corresponding vector can be calculated which approximates the flow rate of anhydrous ammonia to the field. The flow rate is then divided by the corresponding acreage covered to yield a corresponding average application rate per acre.

Manipulating the same information in different ways, and with various conversion constants, allows the invention to display information on the time remaining until tank is empty, number of acres covered per tank and warnings if fluid level drops faster than a set threshold, which would indicate a burst hose or other catastrophic event. The present invention permits this calculation to occur much earlier in the application process, and thus allows the user to compensate for any error between desired application rate and actual application rate. Such displayed data allows the user to compensate for any error between the desired application rate and the actual application rate. The invention, therefore, can lead to significant material savings if these errors in over-application are caught earlier rather than later. Furthermore, the invention can catch under-application errors, which can lead to even greater adverse economic consequences than over-application due to the loss of crop yield.

Other features and advantages of the invention will become apparent to those skilled in the art upon review of the following detailed description and drawings.

Figure 1:
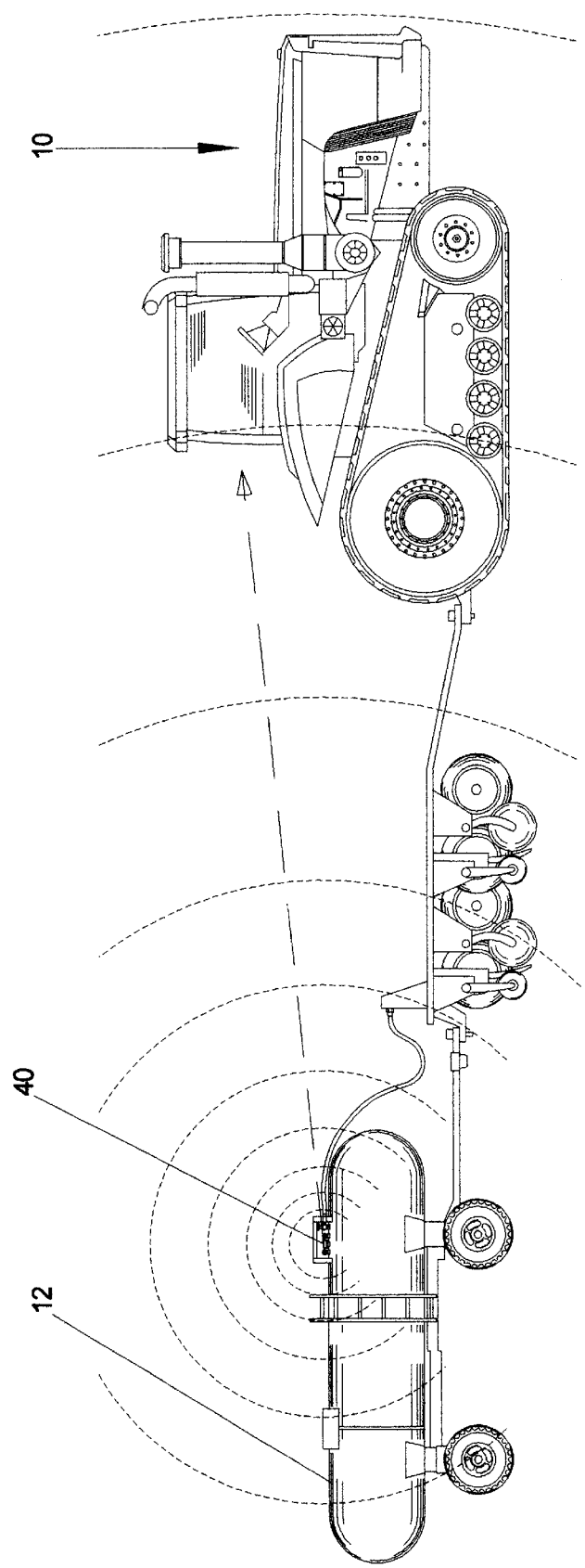
FIG. 1 is a side view of a typical agricultural set-up for the application of the fluid level detection system of the present invention for use with an anhydrous ammonia tank.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof.

DETAILED DESCRIPTION

This invention relates to a remote fluid level detection system using magnetic detection to determine the fluid level from a confined tank. The present invention is suitably designed for use with a pressurized tank containing anhydrous ammonia, but can be practiced with any tank containing fluid and a magnetic float gauge assembly.

Figure 2:
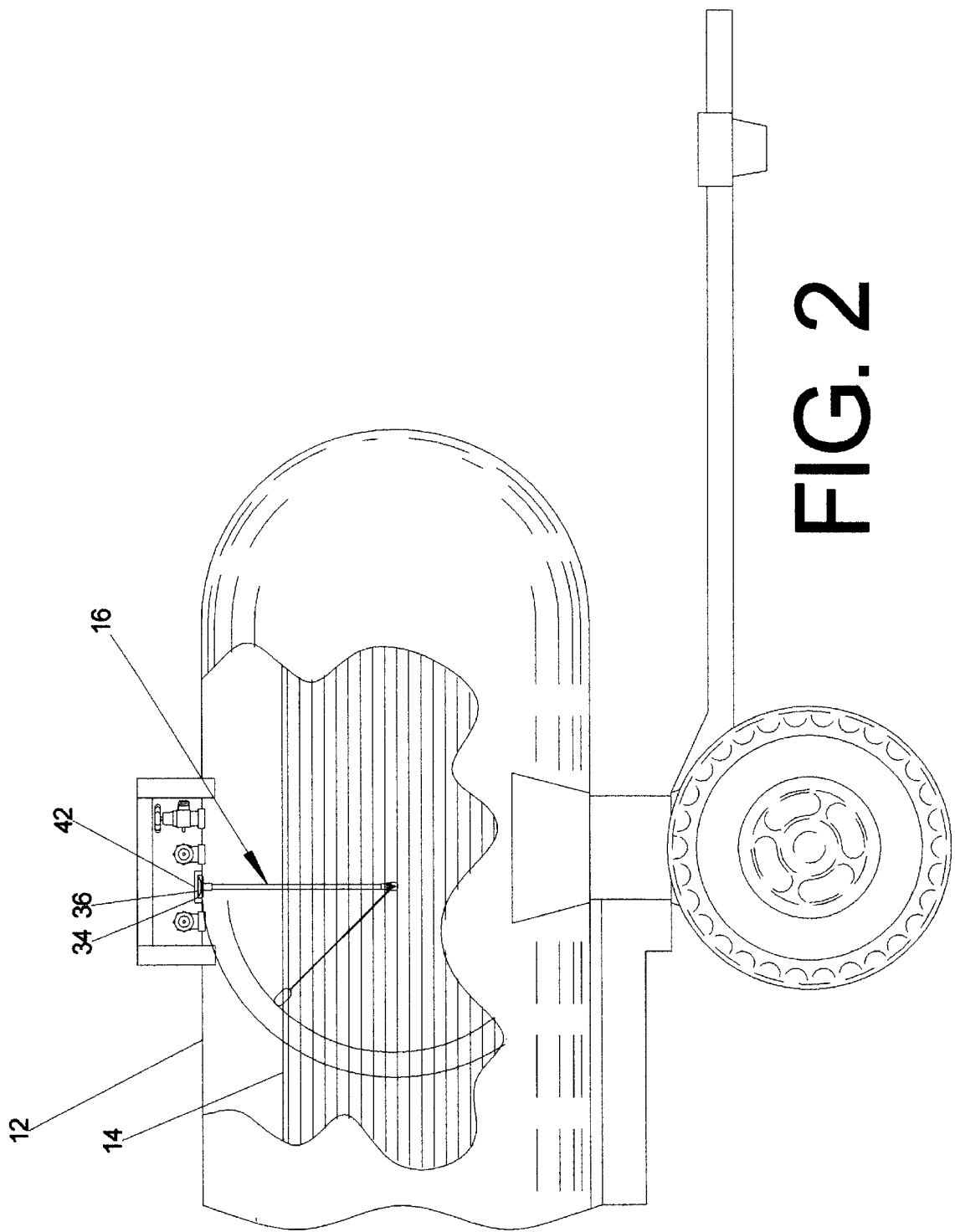
FIG. 2 is a cut-away side view of a tank showing detail of the existing internal float gauge mechanism.
Figure 3:
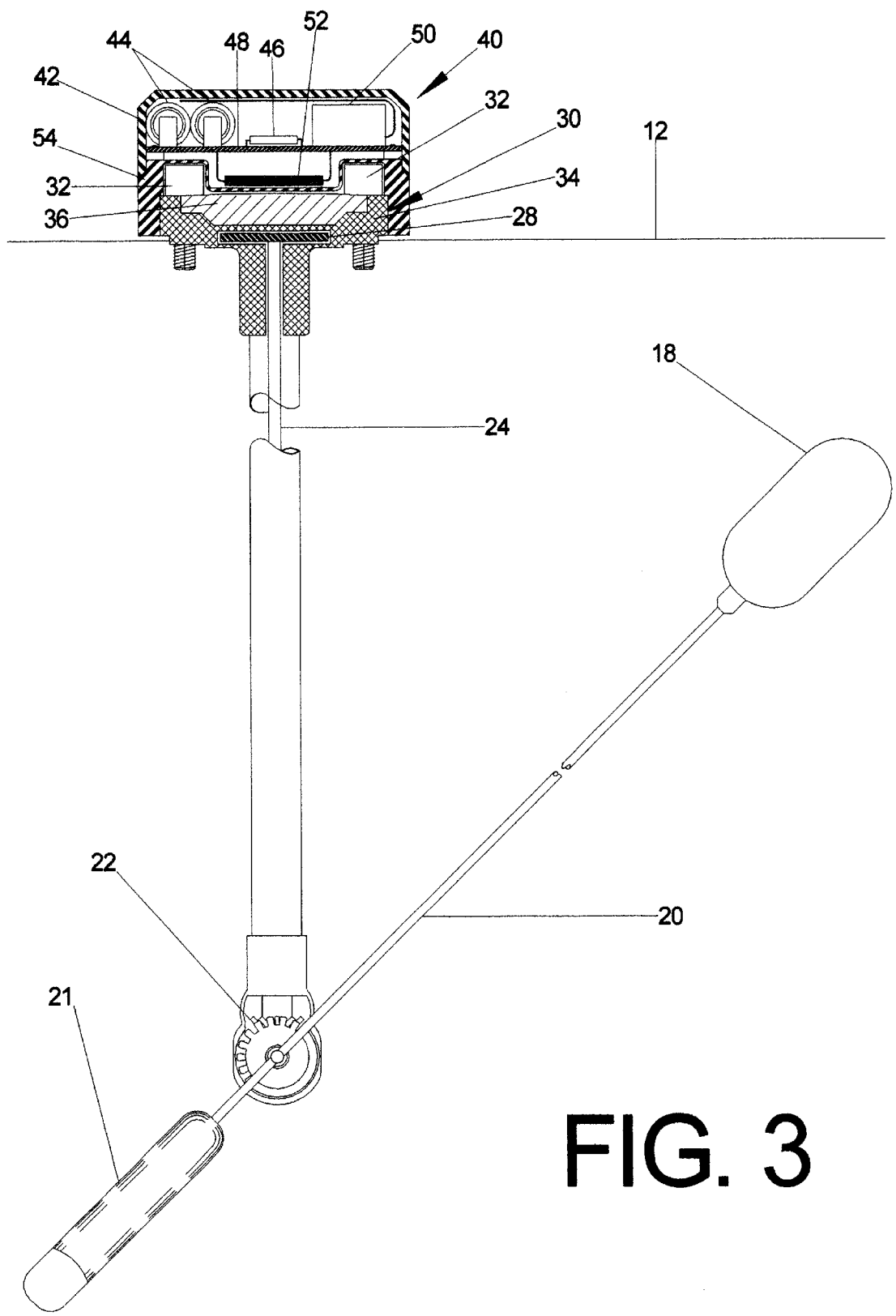
FIG. 3. is a partial side view of the tank module of the present invention mounted on a tank.
Figure 4:
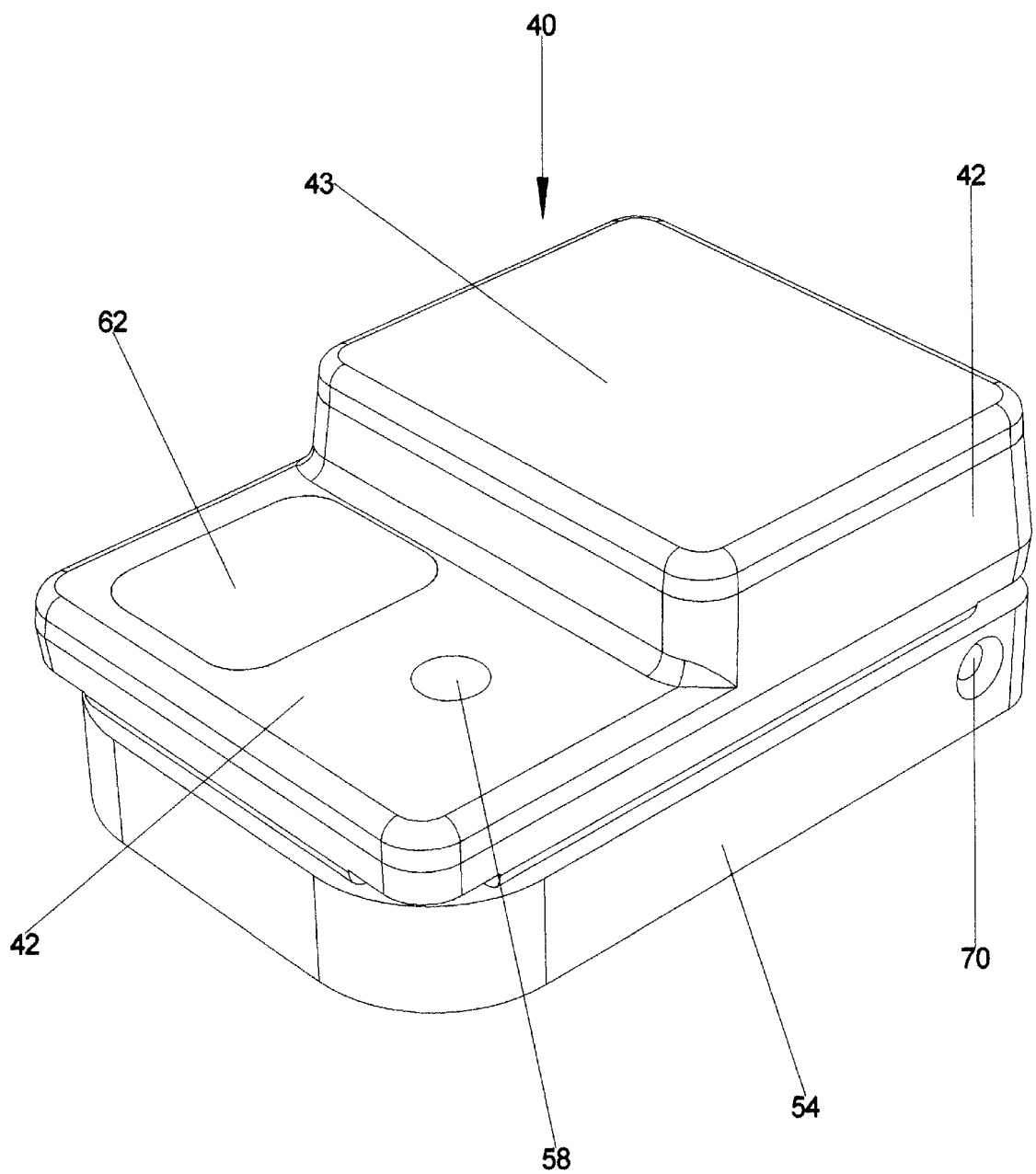
FIG. 4 is a perspective view of the top side of the tank module.
Figure 5:
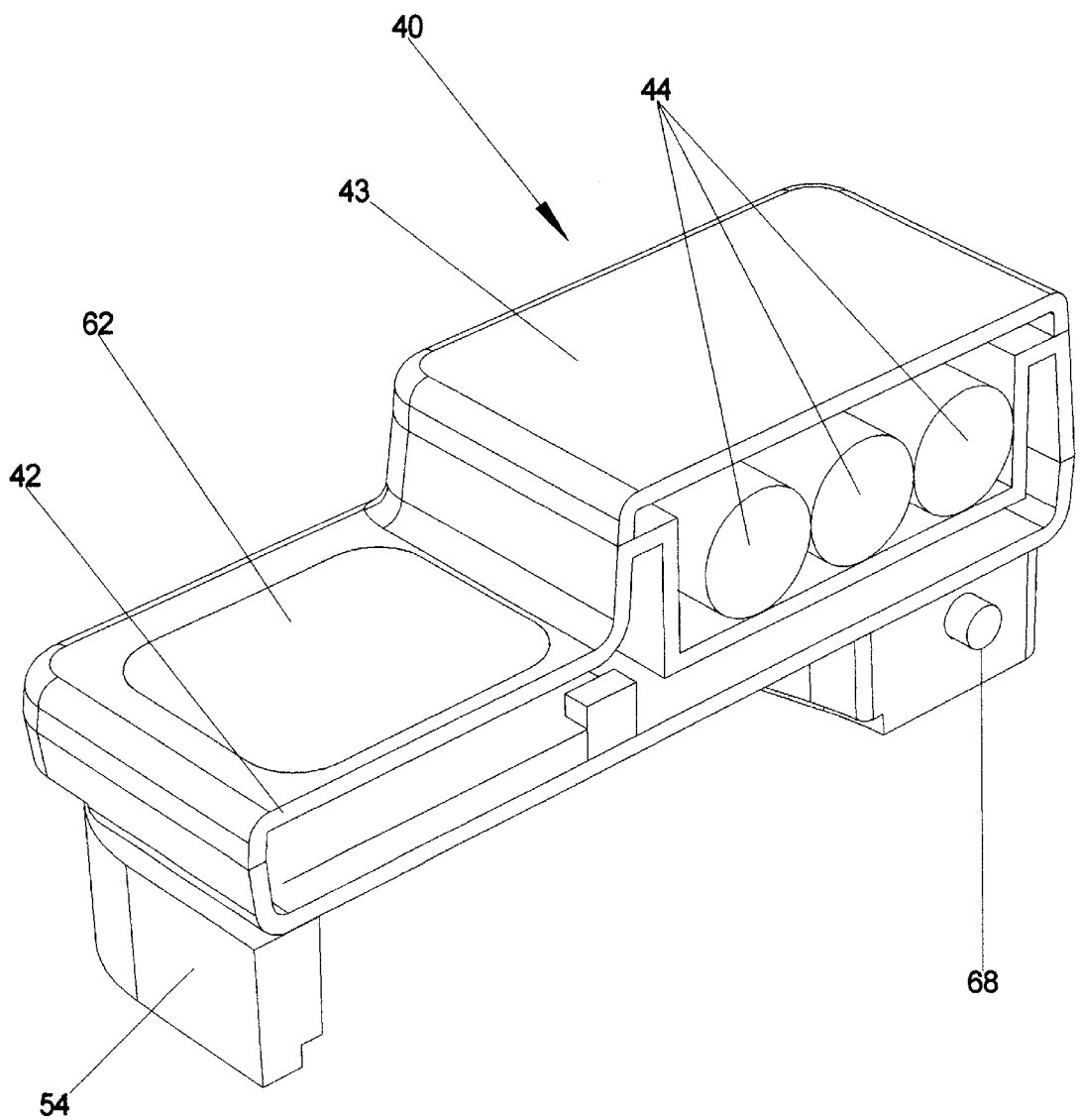
FIG. 5 is a cutaway perspective view of the tank module.
Figure 6:
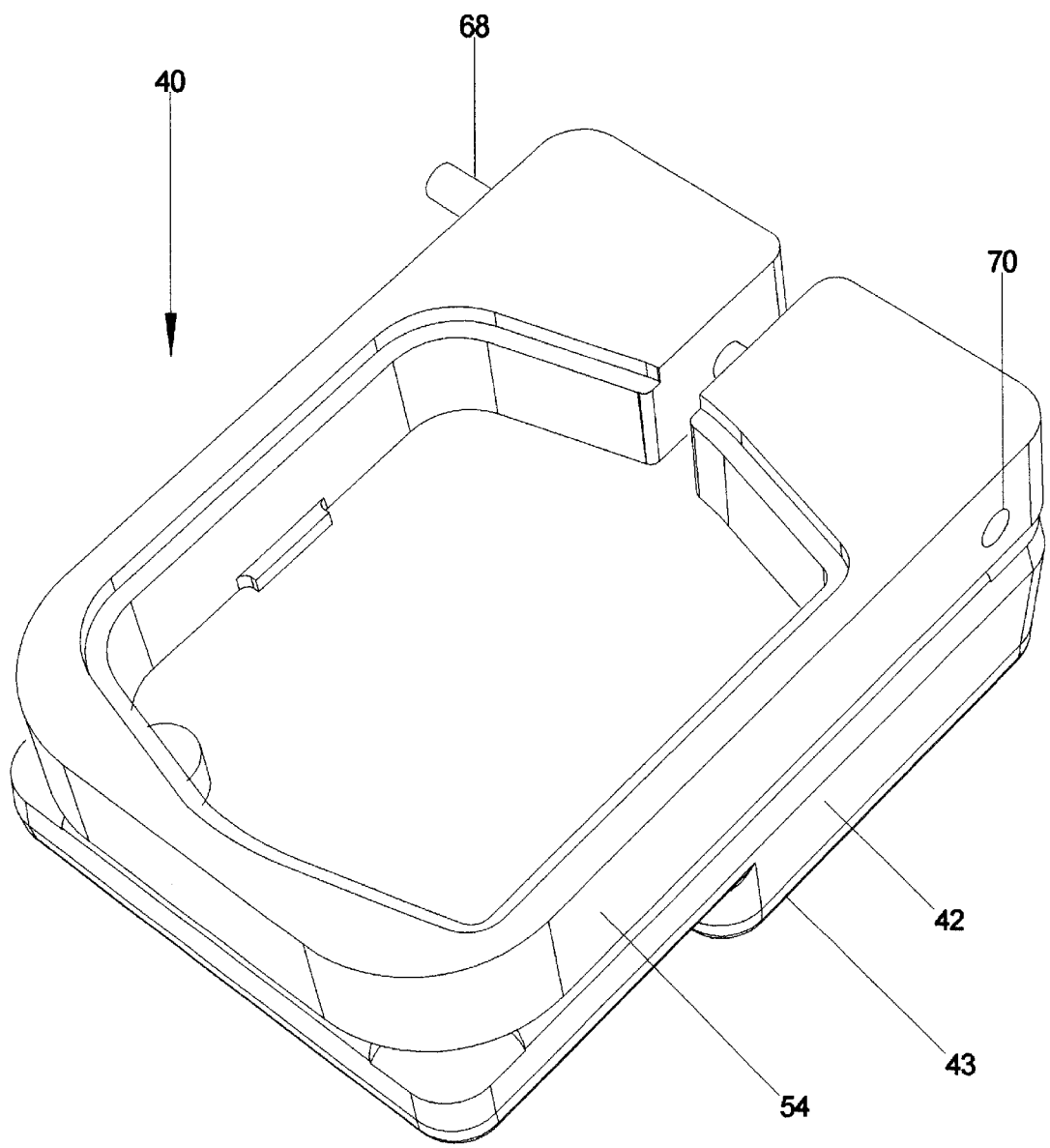
FIG. 6 is a perspective view of the bottom of the tank module.

A typical agriculture set-up in which the present invention is utilized is depicted in FIGS. 1–2. A tractor [10] tows a pressurized tank [12] containing a fluid [14] to be applied to a field. The pressurized tank [12] contains a float gauge assembly [16]. The float gauge assembly [16] is depicted in FIG. 2 and 3. The float gauge assembly [16] comprises a float [18], a float arm [20], a counterweight [21], bevel gears [22], a vertical shaft [24], a magnet [28], and a gauge [30]. The float [18] is attached to a float arm [20] that pivots about the center of the tank. The arm [20] is mechanically coupled via bevel gears [22] to the vertical shaft [24] that runs to the top of the tank [12]. As the fluid [14] level changes within the tank [12] the buoyancy of the fluid [14] affects the position of the float [18]. Fluctuations in the position of the float [18] translate to a small angular rotation of the vertical shaft [24]. The magnet [28] is attached to the top of the vertical shaft [24]. On the outside of the tank [12], the gauge [30] is mounted by mounting bolts [32] which connect the gauge housing [34] to the tank [12]. The face of the gauge [36] comprises a simple compass which tracks the position of the magnet [28].

The tank module [40] of the present invention is depicted in FIGS. 3–9 and 22. The tank module comprises a housing [42], a battery cover [43], battery units [44], a microcontroller [46], a circuit board [48], an RF transmitter [50], a magnetic sensor [52], an attachment band [54], a momentary switch [58], an electric inclinometer [60], a liquid crystal display [62], a clock oscillator [64], and a voltage regulator [66]. [44], a microcontroller [46], a circuit board [48], an RF transmitter [50], a magnetic sensor [52], an attachment band [54], electrical connection wires [56], a momentary switch [58], an electric inclinometer [60], a liquid crystal display [62], a clock oscillator [64], and a voltage regulator [66].

The housing [42] of the tank module [40] is dimensioned to fit over the pre-existing gauge [30] of a tank [12], and is secured to the gauge [30] by way of the attachment band [54]. The housing [42] is suitably comprised of a durable metal such as aluminum. The attachment band [54] can be of many different configurations as depicted in FIGS. 7–9.

Figure 7:
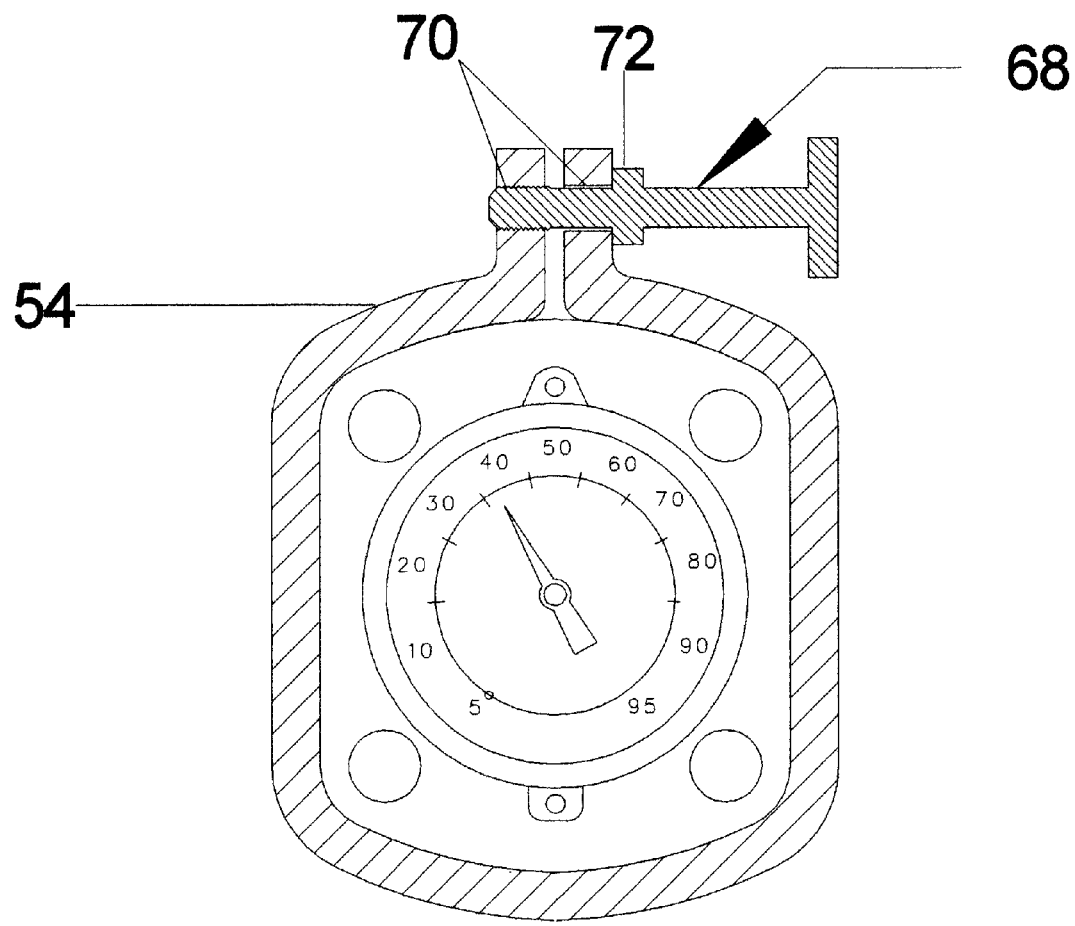
FIG. 7 is a top cutaway view of the tank module showing the positioning of one embodiment of the attachment band of the tank module.

FIG. 7 depicts one embodiment of the attachment band [54]. The tank module [40] is secured to the gauge [30] of the tank [12] by the attachment band [54]. One side of the attachment band [54] is tapped to accommodate an attachment bolt [68] that screws into the attachment band [54]. The other side of the attachment band [54] has a clearance hole [70] sufficiently large to allow clear passage of the attachment bolt [68] to pass through. The attachment bolt [68] contains a flange feature [72] which provides positive pressure to the attachment band [54] face as the attachment bolt [58] is tightened. The attachment band [54], when tightened, applies uniform pressure around the perimeter of the gauge [30] and secures the tank module [40].

Figure 8:
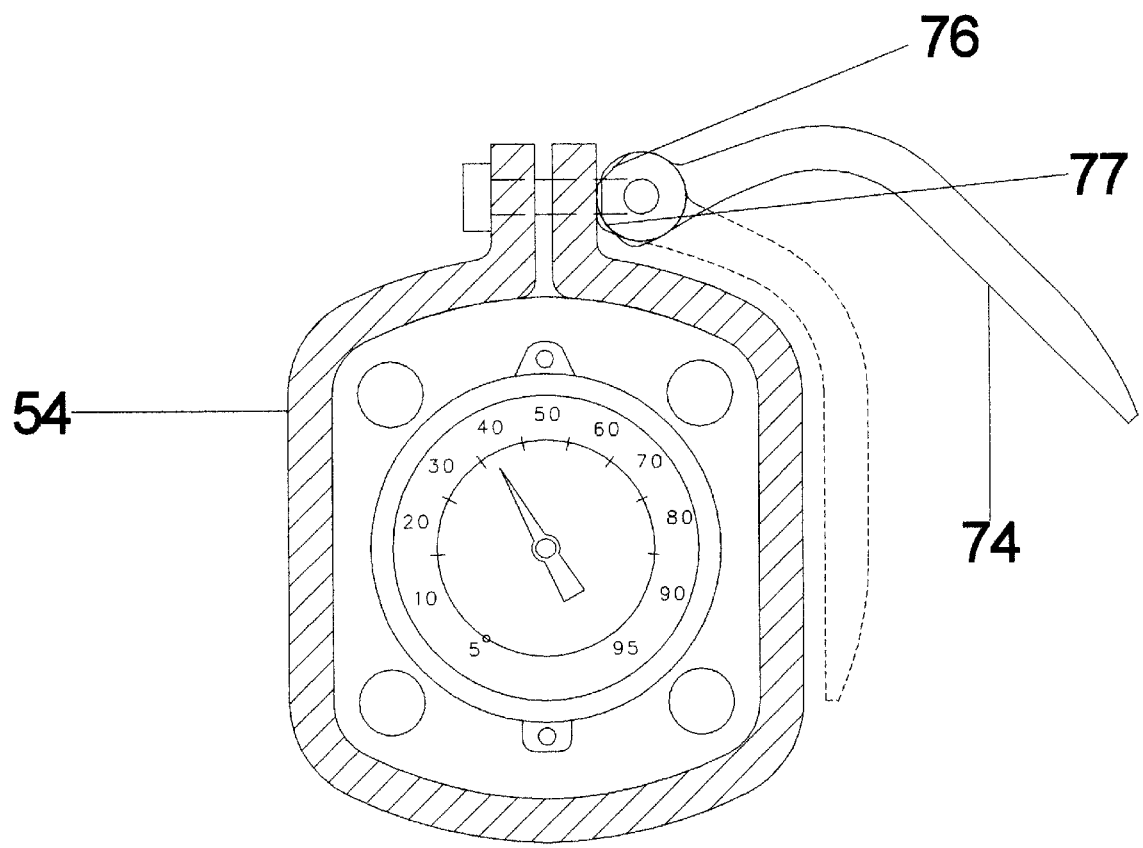
FIG. 8 is a top cutaway view of the tank module showing the positioning of one embodiment of the attachment band of the tank module.

FIG. 8 depicts another embodiment of the attachment band [54]. The attachment band [54] is tightened by means of a lever actuated cam mechanism [74] that constricts the attachment band [54] upon a clamping motion by a lever [74]. The cam features two flat surface positions, an open position [76], and a closed position [77]. The distance from the flattened portion to the center of the cam is greater for the open cam face, which causes attachment faces to move closer together when the lever [74] is clamped in the closed position.

Figure 9:
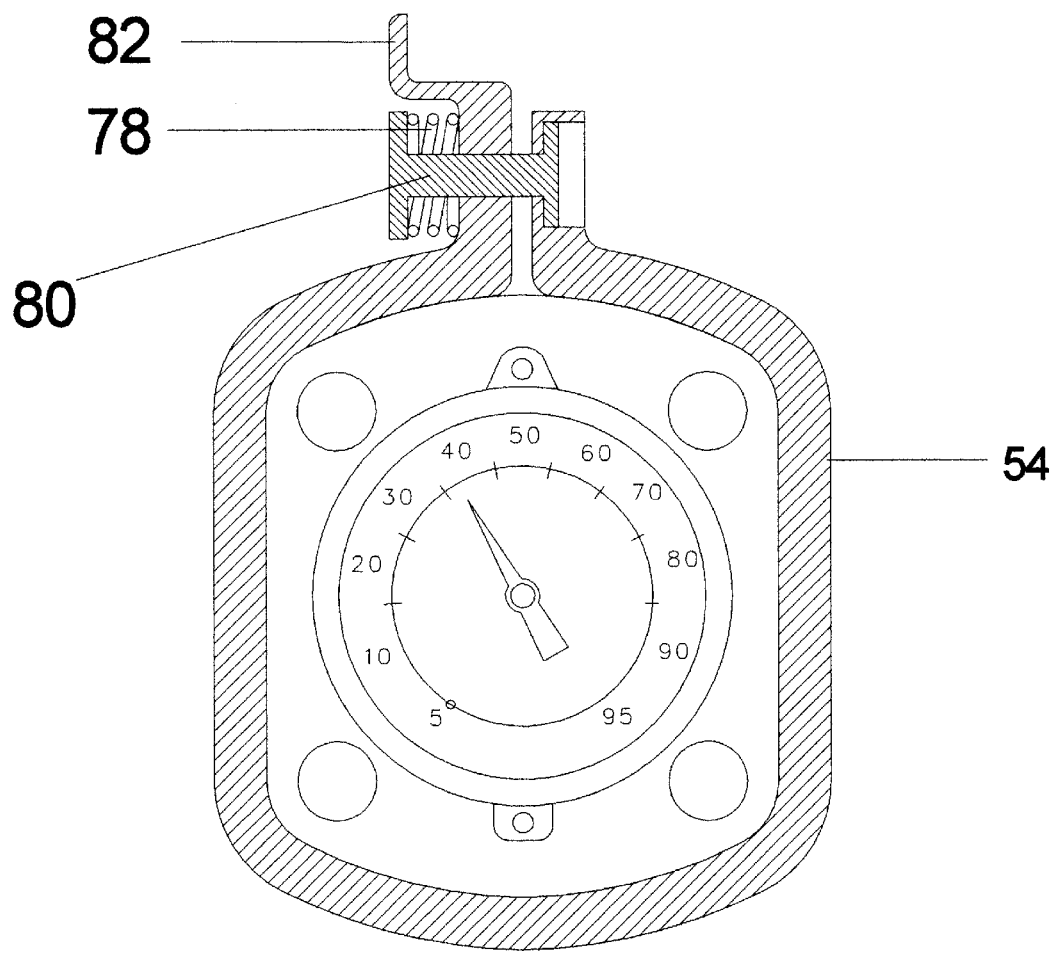
FIG. 9 is a top cutaway view of the tank module showing the positioning of one embodiment of the attachment band of the tank module.
Figure 10:
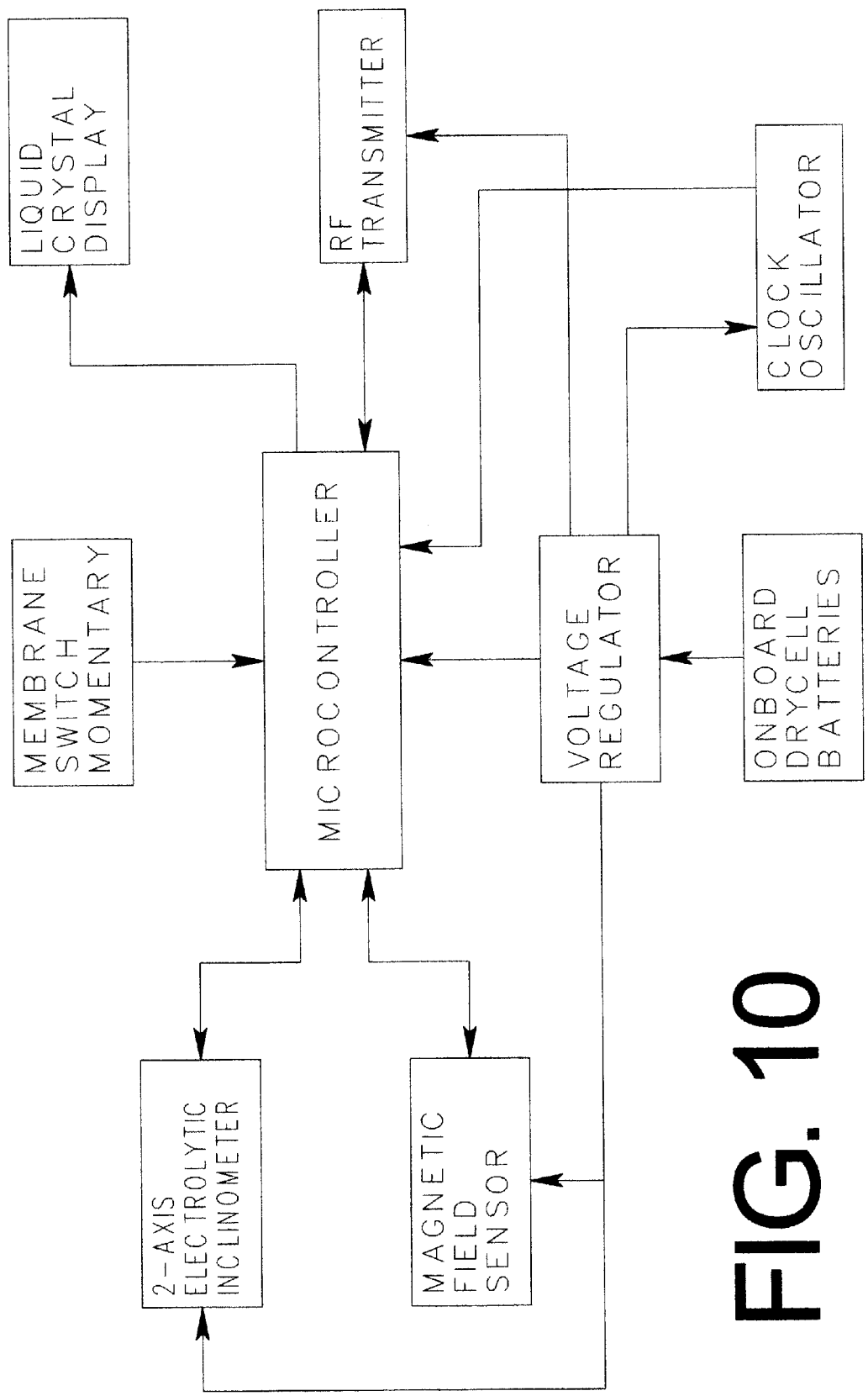
FIG. 10 is a circuit block diagram showing the connections of the circuit of the tank module.

FIG. 9 depicts yet another embodiment of the attachment band [54] of the tank module [40]. A compression spring [78] provides positive pressure to a pressure plunger [80] which in turn tightens the attachment band [54] around the gauge [30]. User releases tension by depressing plunger [80] with thumb while pulling back with index finger on a finger flange [82].

The physical and circuit connections of the tank module [40] are detailed in FIGS. 3–10. The arrows in FIG. 10 indicate the input/output relationship between the circuit components of the tank module. The onboard battery [44], suitably a 9V or a number of AA batteries, is regulated to +3V by the voltage regulator [66], which provides power to all components on common +3V and ground connections. A 16-bit microcontroller [46] houses all system software and serves as the nerve center for the system. Suitable microcontrollers are readily commercially available. Suitable microcontrollers include Texas Instruments TI MSP430 or MSP430F435. The clock oscillator [64] outputs a 4 MHz square wave to the microcontroller [46] for timing reference. The momentary switch, [58] is a switch that activates the system by grounding an input pin on the microcontroller [46]. The inclinometer [60], magnetic sensor [52], liquid crystal display [62] and RF transmitter [50] incorporate an interface with the microcontroller. Suitable magnetic sensors are readily commercially available. Suitable magnetic sensors include a GMR AA002-02 magnetic sensor available from NVE Corporation. Suitable electronic inclinometers are also readily available, suitable inclinometers include the SPECTRON SP5003-A-000 inclinometer from Spectron Systems Technology.

Figure 11:
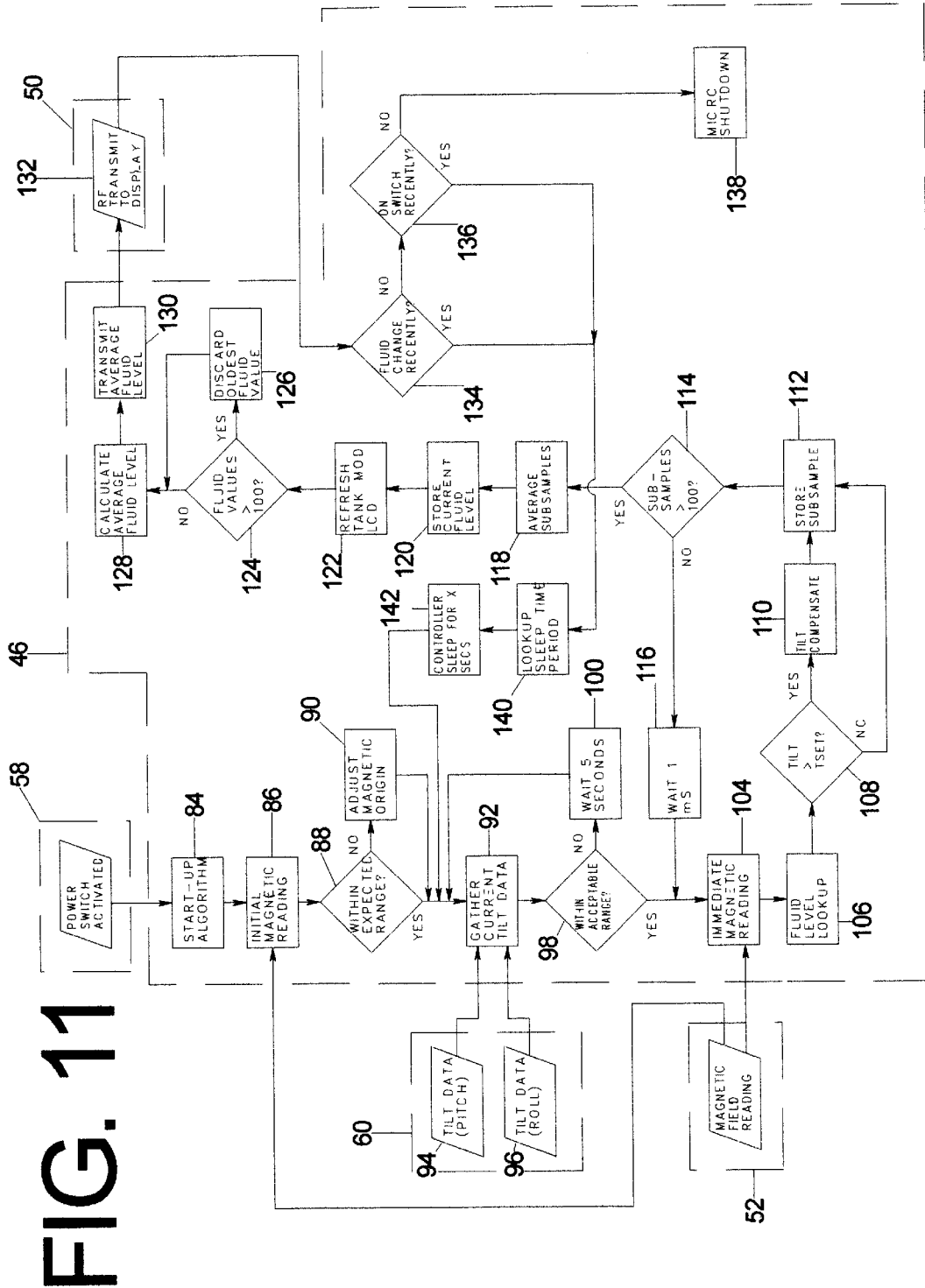
FIG. 11 is a dataflow diagram showing the process carried out by the tank module.
Figure 12:
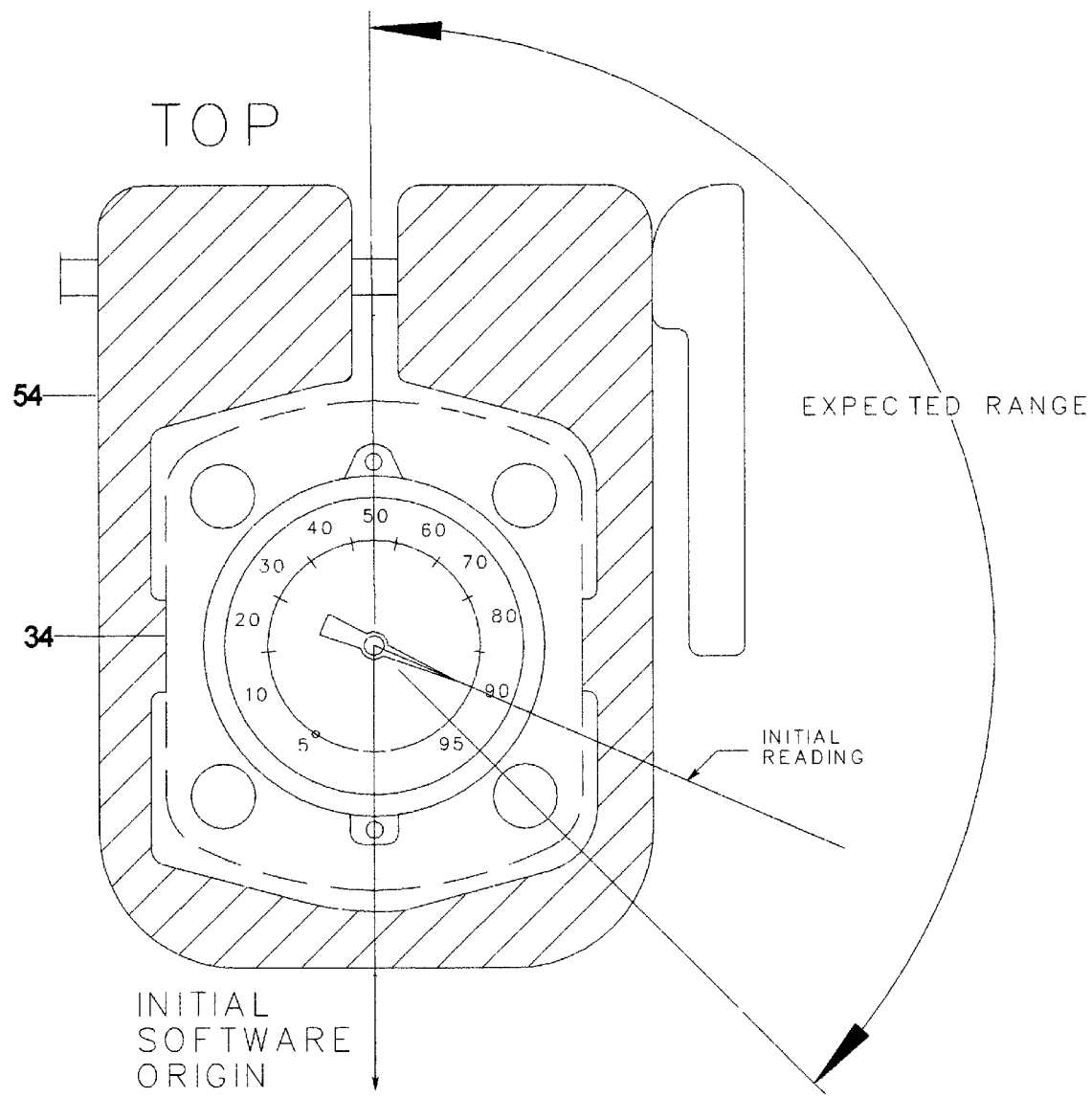
FIG. 12 is a top cutaway view of the tank module mounted on a gauge in a correct orientation, and showing the expected initial angular position of the embedded magnet of the existing gauge mechanism.
Figure 13:
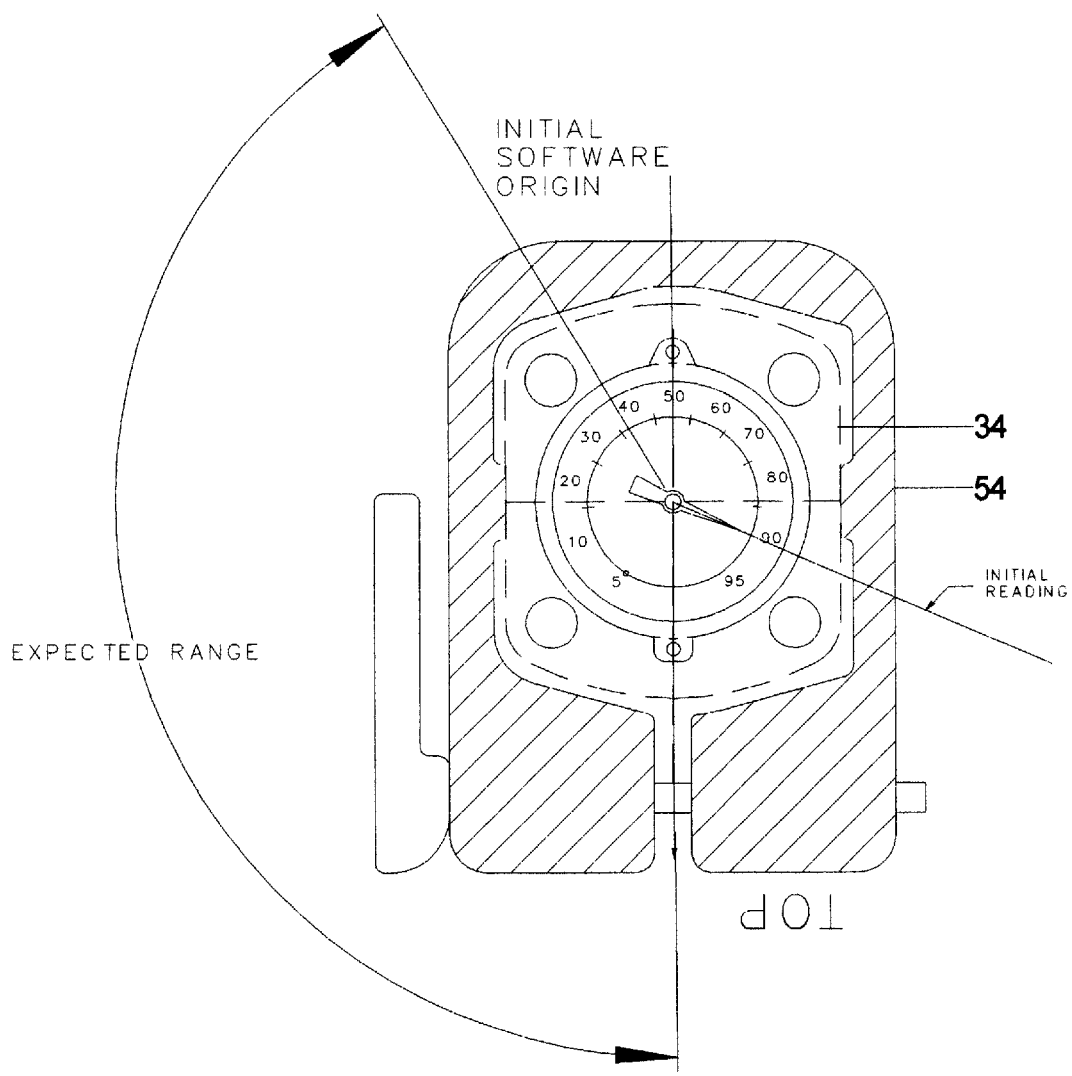
FIG. 13 is a top cutaway view of the tank module mounted on a gauge in an incorrect orientation, and showing the expected initial magnetic reading of the tank module.
Figure 14:
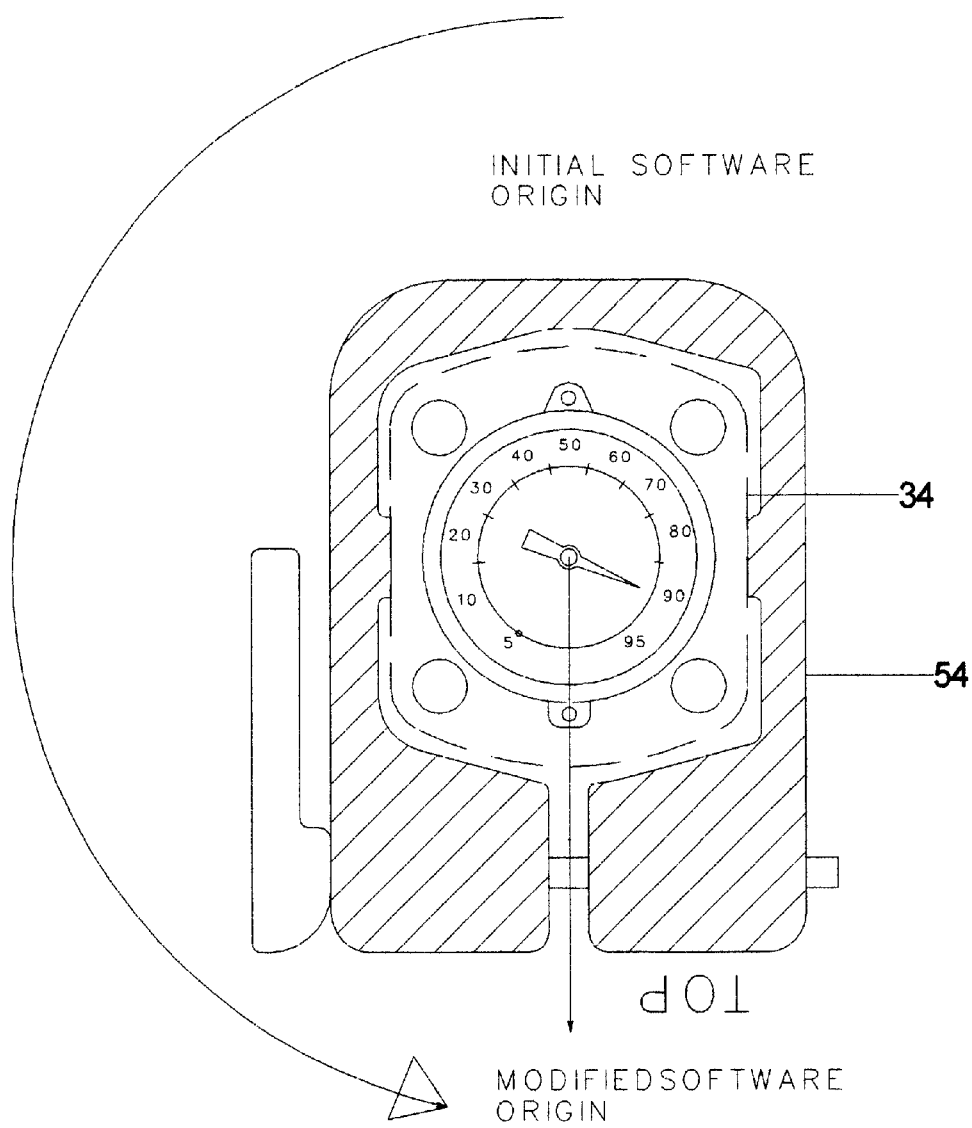
FIG. 14 is a top cutaway view of the tank module mounted on a gauge in an incorrect orientation, and showing the corrected angular reading of the tank module.
Figure 15:
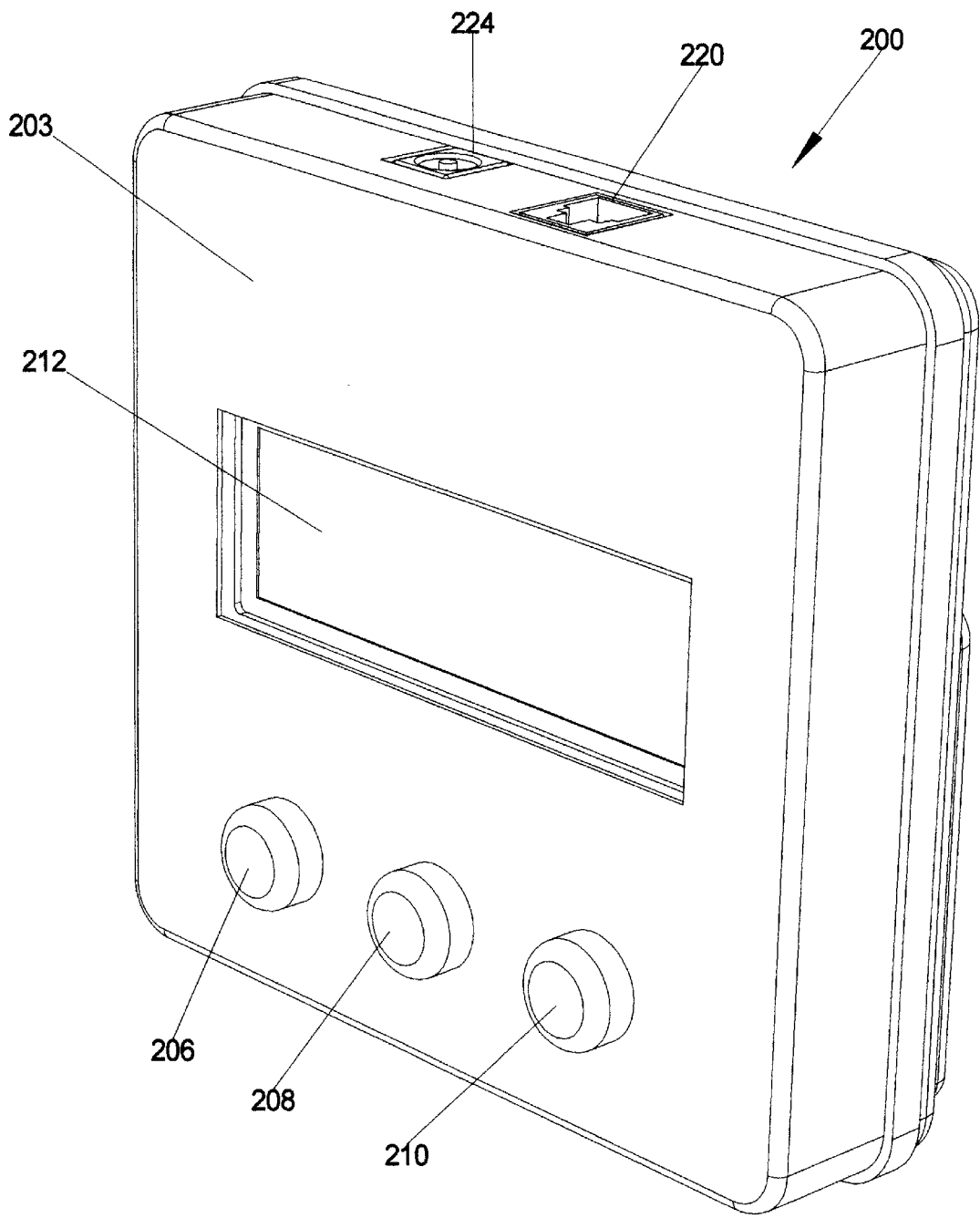
FIG. 15 is a perspective view of the front of the display module.
Figure 16:
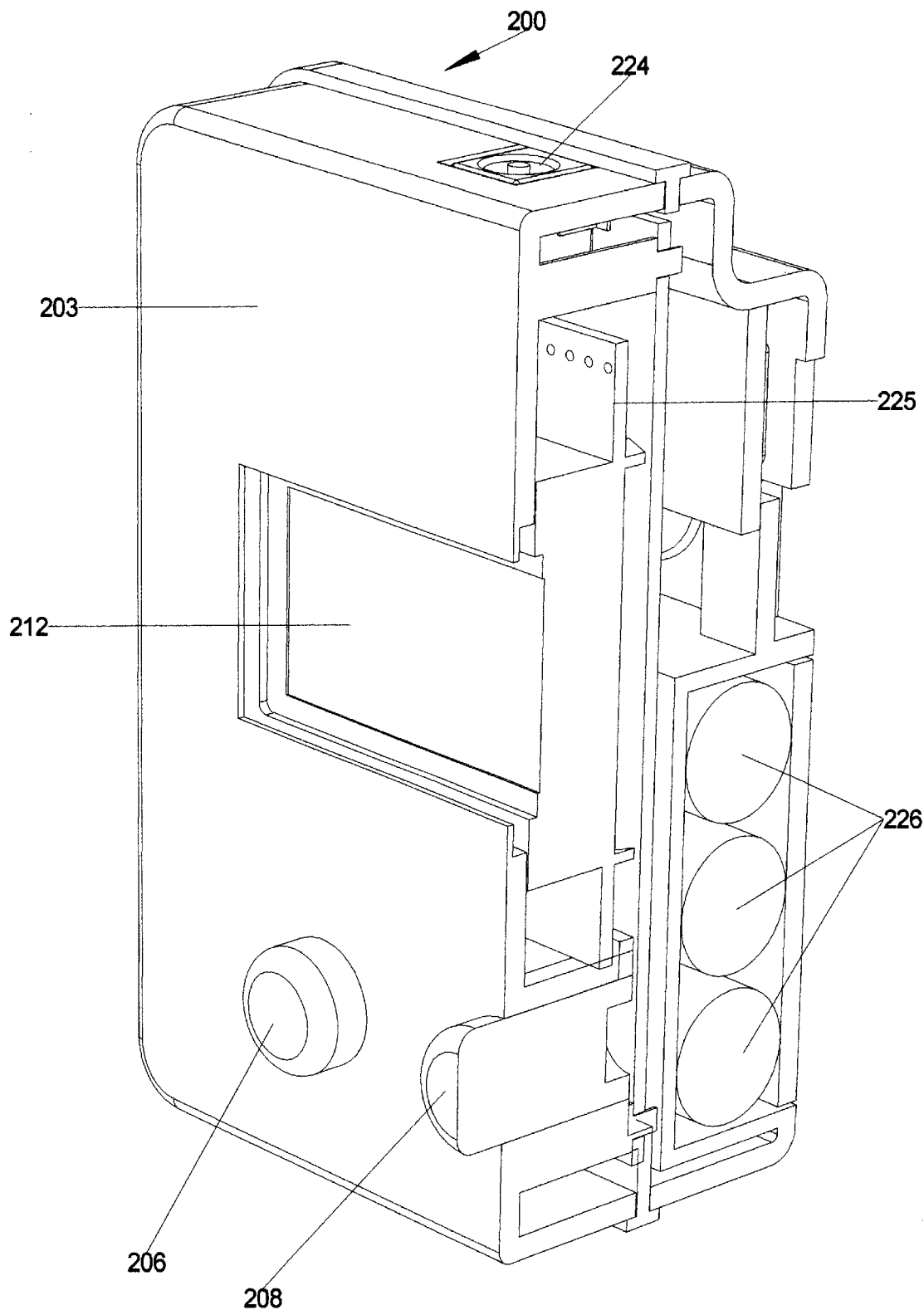
FIG. 16 is a cutaway perspective view of the display module.
Figure 17:
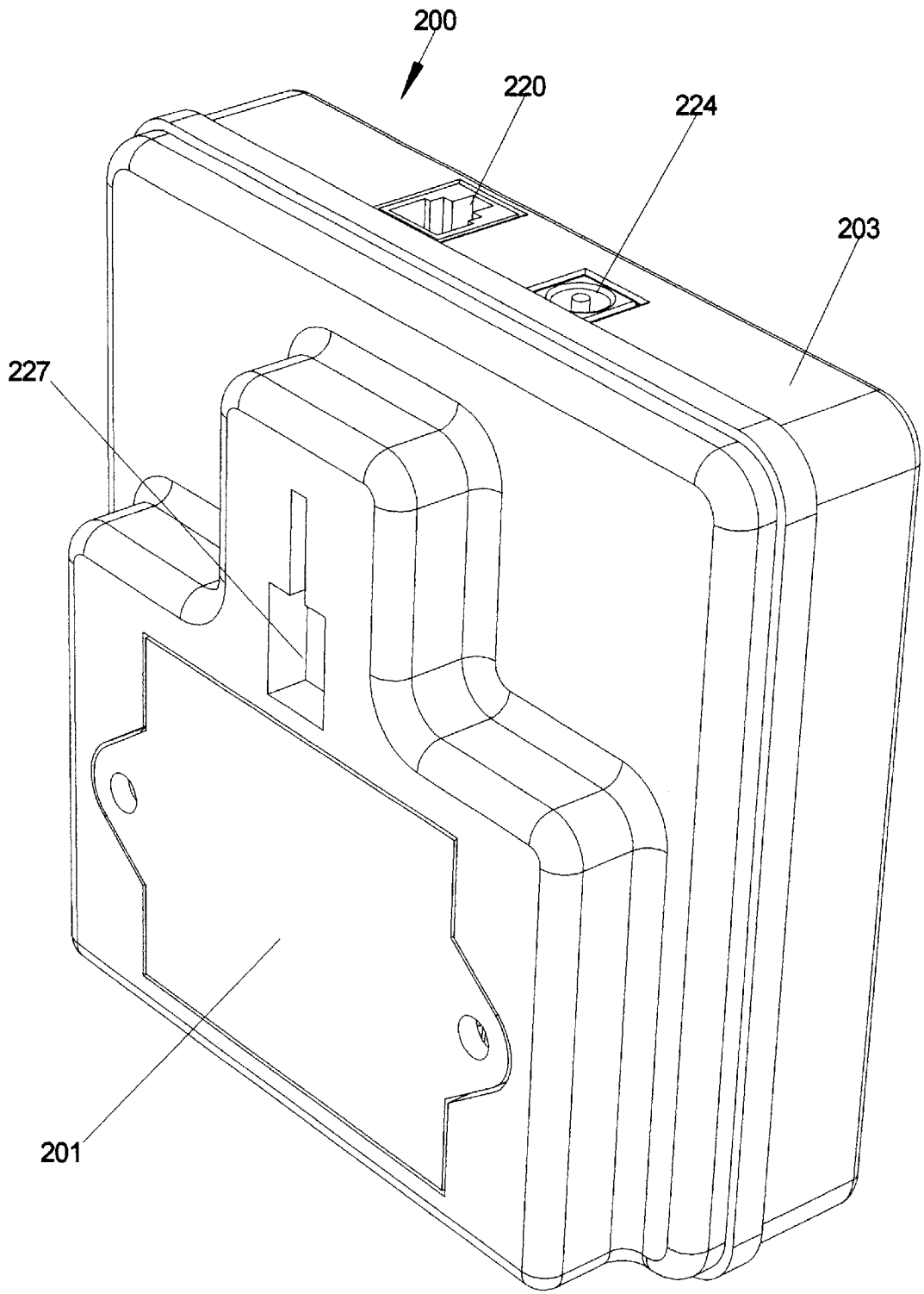
FIG. 17 is a perspective view of the back of the display module.
Figure 18:
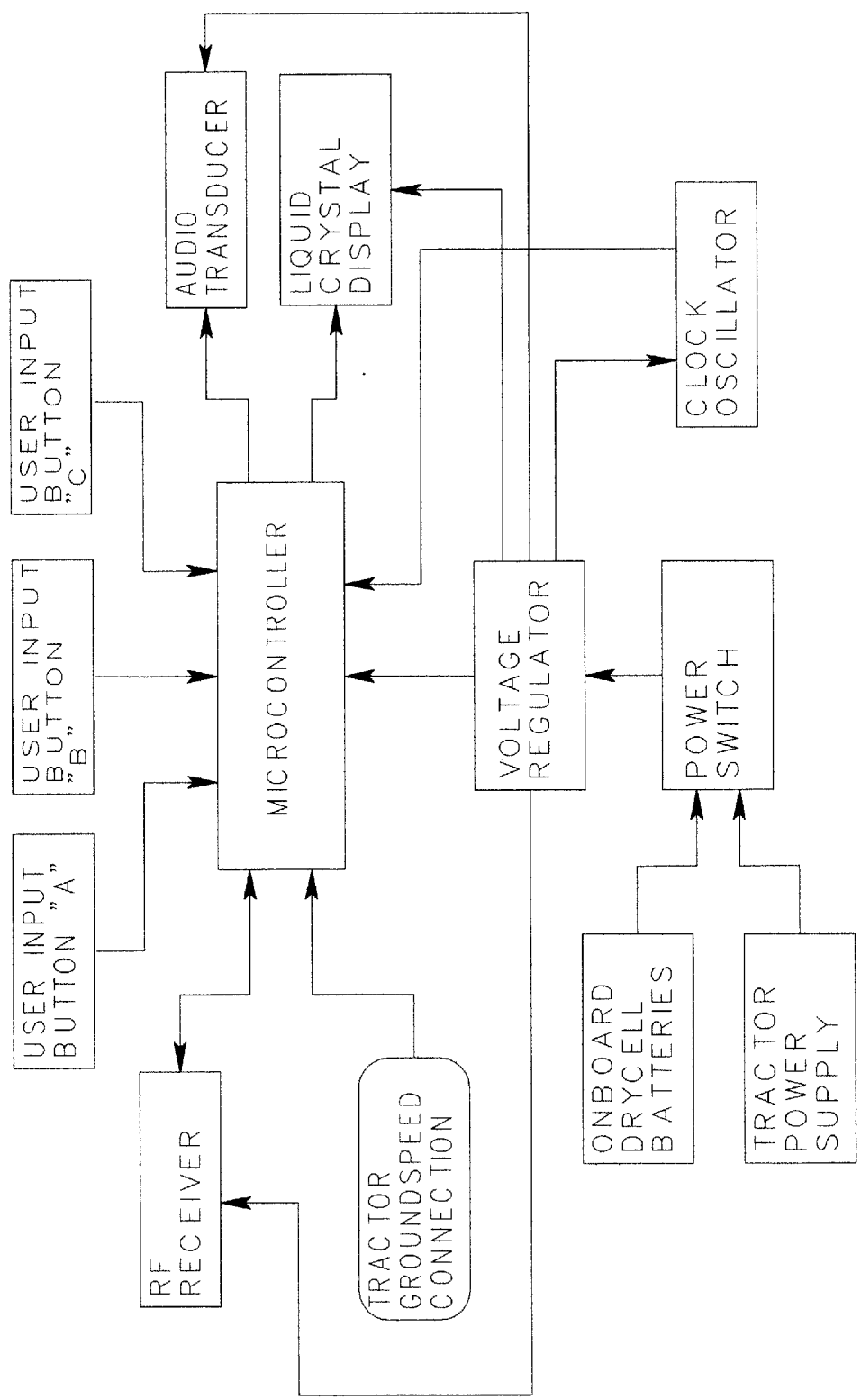
FIG. 18 is a circuit block diagram showing the connections of the circuit of the display module.

The processes undertaken by the tank module [40] are detailed in FIG. 11. After the tank module [40] is mounted to the gauge [30] of the tank [12], the user depresses the momentary switch [58] to initiate operation and "wake-up" of the microcontroller [46]. The microcontroller [46] goes through a start-up routine [84] which resets the input/output devices connected to the microcontroller [46]. The microcontroller [46] then pauses momentarily for the circuit to stabilize. The magnetic field sensor [52] is then interrogated by the microcontroller [46] in an initial magnetic field reading process [86] which indicates to the microcontroller [46] the precise position of the fluid indicating needle on the face of the gauge [36]. As the tank module [40] will be attached to anhydrous ammonia tank [12] most often at the beginning of the fertilizer process, when the tank [12] is freshly filled, the tank [12] should be filled to between 85–95% full. The microcontroller [46], therefore, is programmed to assume that the initial magnetic field measurement [86] will be within a pre-set boundary that correlates to a tank that is greater than 50% full. FIG. 12 displays the angular position of the gauge [36] with respect to such an assumed start fluid level. If the initial magnetic field reading is within these preset boundaries [88], the process continues with the original origin setting. However, if the initial magnetic field reading is not within preset boundaries, the microcontroller [46] concludes that the tank module has been inadvertently attached to the gauge mechanism exactly 180 degrees from the desired orientation and the microcontroller [46] then automatically moves [90] the origin point 180 degrees to be compatible with the relative orientation of the gauge [30]. FIG. 13 shows the angular position of the gauge [36] when the tank module [40] is placed in the wrong orientation, and FIG. 14 shows the angular readings of the tank module after the realignment of the origin by the microcontroller [46].

The electronic inclinometer [60] is interrogated [92] by the microcontroller [46] to detect the tank module's pitch [94] and roll [96], which correlates with the anhydrous ammonia tank's [12] pitch and roll. The microcontroller [46] analyzes these tilt values to see if the field tank [12] is on sufficiently level ground to take fluid level measurements [98]. If the pitch [94] values are above a preset threshold, suitably above a 10% grade or 5.7 degrees from level, the microcontroller [46] "loops" for a preset time, suitably 5 seconds [100], and then interrogates [92] the tilt sensor [60] again to see if the field tank [12] has moved sufficiently back to level ground as the fertilizing process is continuing. If the pitch [94] and roll [96] values are within preset thresholds, the microcontroller [46] interrogates the magnetic field sensor [52] to measure the immediate magnetic reading [104]. This magnetic reading [104] is then cross-referenced with an internal "look-up" table [106] that correlates magnetic field orientation with an actual volumetric fluid level, based on preinstalled knowledge of the tank's geometry and gauge mechanism's behavior. The pitch [94] data is used again to compare [108] the field tank's [12] tilt to another pre-set threshold. If the pitch [94] values are above the threshold, suitably a 5% grade or 2.86 degrees from level, the microcontroller [46] compensates for the pitch and roll effects on perceived fluid level value [110] and stores [112] adjusted fluid level sub-sample accordingly. If the pitch [94] values are below the threshold [108], the process immediately stores [112] fluid level sub-sample without further compensation.

A procedure to compensate for the "sloshing" of liquid in the tank is then undertaken. The microcontroller [46] compares [114] the number of sub-samples stored [112] at this point to a preset threshold, suitably 100 or 1000 sub-samples. If there are insufficiently few sub-samples (number of sub-samples is below the preset threshold), the microcontroller [46] waits for a preset duration of time [116], suitably about 1 mS, before sampling again the immediate magnetic reading [104] and repeating the process. If there are sufficiently enough sub-samples (number of sub-samples is above the preset threshold), the microcontroller [46] averages the stored sub-samples [118] and then stores this averaged value as the current fluid level [120]. The microcontroller [46] then updates [122] the liquid crystal display [62] on the tank module [40]. The microcontroller [46] next compares [124] the number of current fluid level values to a preset threshold, suitably 100 or 1000 values. If the number of stored current fluid level values is above the set threshold, the oldest value within this data set is discarded [126], which has the affect of incrementally updating data set to reflect more current fluid level data.

Next, the microcontroller [46] calculates a weighted average of the fluid level values [128] and stores this as a final moving average parameter, which is the final approximation of the fluid-level within the field tank [12]. The microcontroller [46] then sends [130] this singular fluid-level value [128] to the radio frequency transmitter [50] which transmits [132] the fluid level information to the radio frequency receiver [202] in the display module [200].

The tank module [40] circuitry automatically shuts down if both of two criteria are satisfied. If the fluid level information [128] has not changed beyond a preset threshold [134], suitably a 2% change in fluid level within 2 hours, and the momentary switch [58] has not been depressed within a preset threshold [136], suitably 2 hours, the tank module [40] circuitry shuts down [138].

Since the gauge [30] reading will change at a faster rate at the high and low portions of the tank volume relative to the mid-portions of the tank volume, the tank module [40] of the present invention allows the fluid level refresh rate to be optimized for both performance and power saving. If fluid level data has changed sufficiently within the preset threshold [134] or the momentary switch [58] has been activated within a preset period of time [136], the microcontroller [46] correlates averaged fluid level data [128] with a corresponding sleep time using another look-up table [140]. The found sleep time value from the look-up table [140] defines the amount of time the tank module [40] will power down [142] until next fluid level value will be taken, and the process repeats itself by gathering current tilt data [92].

FIGS. 15–21 detail the display module [200]. The display module [200] comprises a housing [203], a battery cover [201], a circuit board [225], an RF receiver [202], a microcontroller [204], input buttons [206, 208, 210], a liquid crystal display [212], an audio transducer [214], a power switch, a voltage regulator [218], a tractor groundspeed connector [220], and a clock oscillator [222]. The display module [200] can be powered by an onboard battery [226] or by the power supply of a tractor, through a power supply input [224] in the display module [200]. The display module [200] can be mounted within a tractor [10] cab. The display module [200] can be mechanically fastened either via suction cups to the windshield, a mounting holster within the cab or by magnetic means. The display module can also contain a T-slot attachment [227] to aid in mounting.

The physical and circuit connections of the display module [200] are detailed in FIGS. 15–18 and 20–21. The arrows in FIG. 18 indicate the input/output relationship between the components. A 16-bit microcontroller [204] is powered via 12V tractor supply or internal batteries [226] preferably 9V or AA batteries, within the display module housing [203]. The power switch is a toggle or rocker switch which closes the circuit between the power supply and voltage regulator [218]. The voltage regulator [218] regulates external voltage down to +3V for circuit components. The display module [200] can be connected to the tractor's onboard Doppler groundspeed instruments or other speed indicators to have access to the tractor's current speed for purposes of secondary calculations and features. The tractor's ground speed indicator is electronically interfaced with microcontroller [204] via a cable and appropriate connectors [220]. The clock oscillator [222] supplies a square wave at 4 MHz for timing purposes to microcontroller. [204]. The liquid crystal display [212] is directly interfaced with microcontroller [204] to provide visual information to the user.

Three momentary input pushbutton switches [206, 208, 210] provide means by which the user may enter relevant information pertaining to tank size and field implement width, as well as select a display mode. The input buttons [206, 208, 210] are located directly beneath the liquid crystal display [212]. The function of each input button [206, 208, 210] changes depending on the point in software flow.

The RF receiver [202] interfaces directly with microcontroller [204]. The audio transducer [214] provides user with an audio alert and is powered by the +3V supply and signaled by microcontroller [204].

Figure 19:
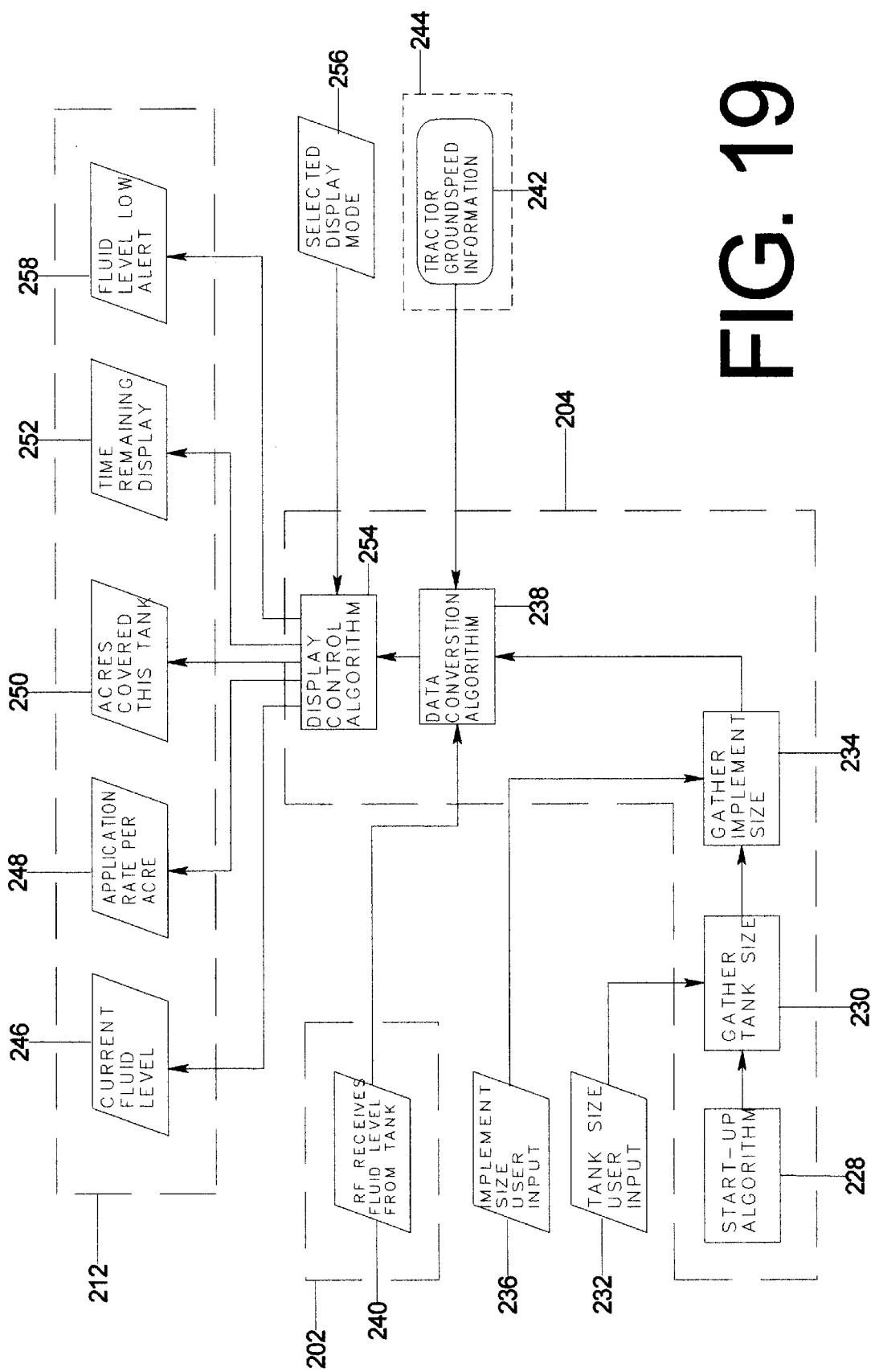
FIG. 19 is a dataflow diagram showing the process carried out by the display module.
Figure 20:
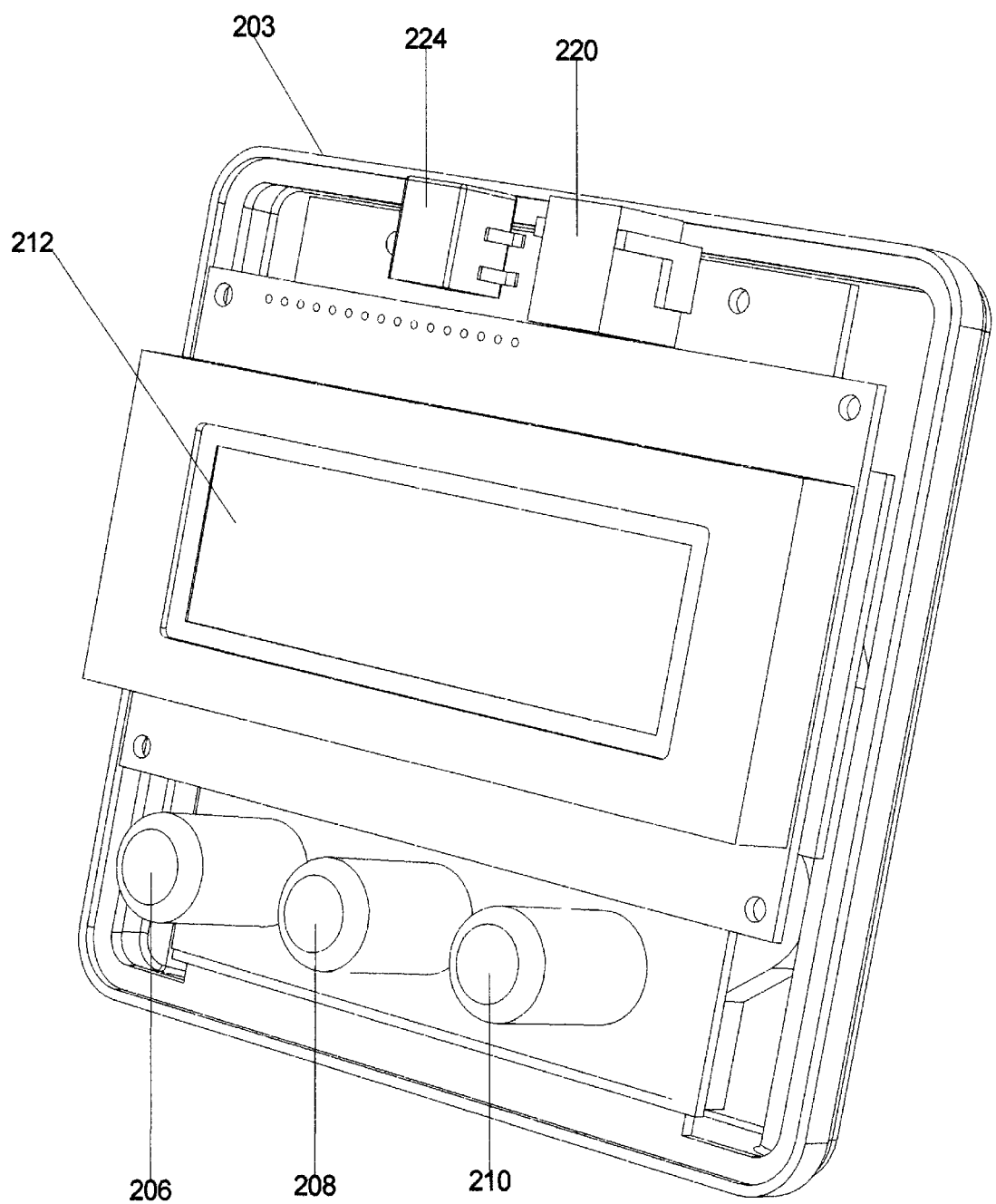
FIG. 20 is a front, cutaway view of the display module.
Figure 21:
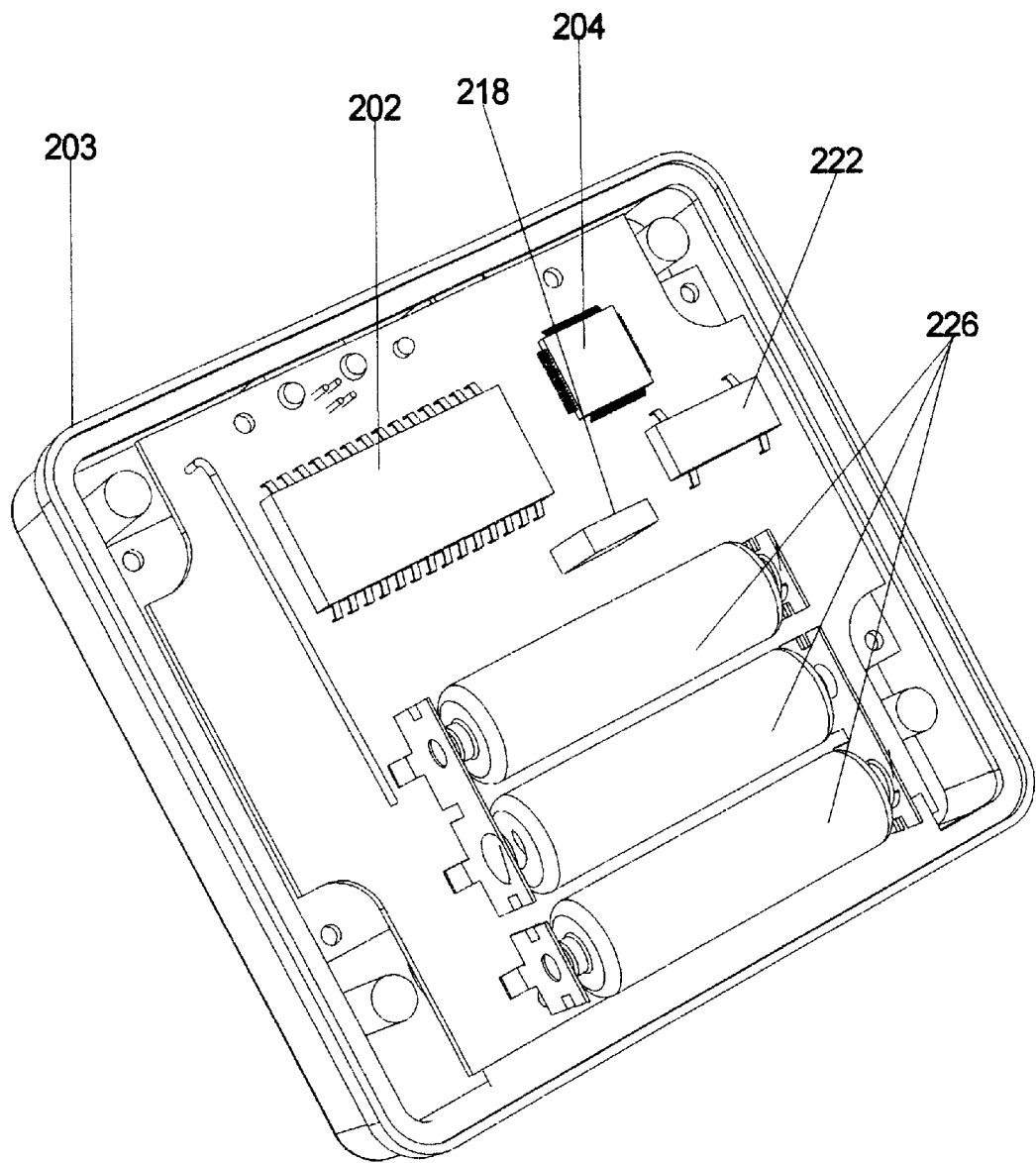
FIG. 21 is a back, cutaway view of the display module.
Figure 22:
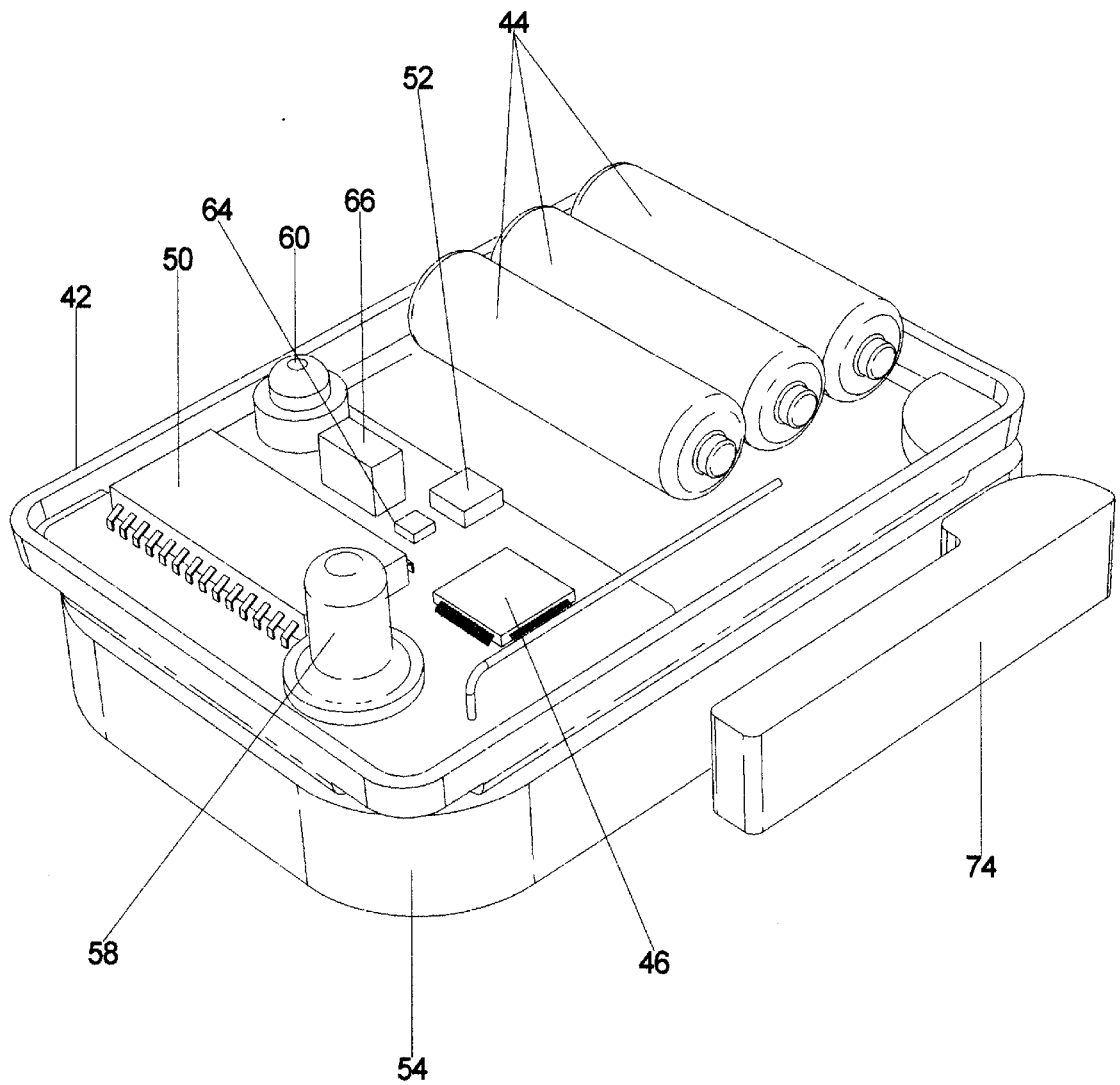
FIG. 22 is a perspective cutaway view of the tank module.

The processes carried out by the display module [200] are detailed in FIG. 19. The user initiates the display module [200] by pressing the power switch [216], at which time the display module microcontroller [204] and support circuitry go through a start-up algorithm [228] whereby the various components are reset, and an audible alert is made by the audio transducer [214]. This indicates that the unit has power and the microcontroller [204] initiates a brief welcome message on the liquid crystal display [212]. The user is then prompted with a request to input the total capacity of the anhydrous ammonia tank in gallons [230]. The user may select one of several standard anhydrous ammonia field tank sizes: 1000, 1450, 1800 and 2000 gallon sizes, or may enter another size manually [232]. Once an appropriate tank size has been entered, user is prompted with a request for the field implement width [234]. User enters implement width [236] by selecting one of several common field implement widths or enters manually an implement width not offered as a choice. The anhydrous ammonia field tank volume input [232] and the application implement width [236] represent system constants and do not change during application period.

The microcontroller [204] then moves into a continuous data acquisition and processing mode [238] and outputs desired information to the user. This information is updated regularly. Periodic updates on current fluid level [128] are broadcasted to the display module via a radio frequency transmission [132] from the tank module's RF transmitter [50] and are received [240] by the RF receiver [202]. Periodic fluid level information is stored within the microcontroller [204] memory banks along with an associated time that the fluid level data was acquired. Simultaneously, current groundspeed data [242] is gathered from the tractor's groundspeed electronics [244]. Tractor groundspeed information [242] is combined with the width of the application field implement [236] to calculate total area covered by the application process by utilization of a simple multiplication algorithm:

Acres covered per sample period Tractor groundspeed×Width of Application Implement×Sample Period.

Since it is presumed the tractor speed is not constant, and continuously varying with field conditions and operator circumstances, total acreage covered is an integral function that cumulatively adds acreage covered over each sample period. Rate of groundspeed sampling may occur at any frequency to increase or decrease the accuracy of calculation relating to total acres covered;

Current fluid level information [128] received [240] from the tank module is stored in another memory bank within the display module microcontroller [204]. A table of fluid level values at various points in time is generated, and permits the calculation of the total quantity of fluid dispensed to farmland to be generated based on the microcontroller's [204] calculation of the difference between the fluid level at start of process and the current fluid level by the use of the following algorithm:

Quantity dispensed=(% at start−% currently)×total tank size.

The display module microcontroller [204] also calculates the average application rate per acre using the following algorithm:

Average application rate per acre=Total Quantity/Total Acres Covered.

The fluid level tables contain information on the time each fluid level data point was taken. By calculating the difference between two fluid level values and comparing this difference to the corresponding difference in time, a ratio is found that corresponds to the rate of drain within the tank. Once the drain rate has been established, current fluid levels can be extrapolated to determine future fluid levels based on a constant rate of drain. Based on this data the microcontroller [204] can determine the estimated time at which the fluid level will reach zero.

Through the manipulation of the various inputs into the display module [200], the microcontroller [204] calculates continuous values for the following parameters: current fluid level [246], application rate per acre [248], acres covered [250], and time remaining until tank is empty [252]. These four values may be displayed on the liquid crystal display [212] as the display control algorithm [254] receives information from user on the desired mode of display [256] by the input buttons [206, 208, 210].

Additionally, when the tank [12] reaches a predetermined low fluid level, suitably below 5%, the liquid crystal display [212] alerts user that fluid level is low [258] and is accompanied by an audible alert produced by the audio transducer [214]. The audio alert may be disarmed by the user.

EXAMPLES

Example 1

Input Button Designation and Use

The display module [200] interfaces with the user via three general purpose input buttons [206, 208, 210]. The input buttons [206, 208, 210] are located directly beneath the liquid crystal display [212]. The function of each input button [206, 208, 210] changes depending on the point in software flow. Each button's [206, 208, 210] function is made known to the user by utilizing the bottom row of characters of the liquid crystal display [212] to print directly above each button [206, 208, 210] what the corresponding button will cause the display module [200] to do at various points in software flow.

The display module [200] initiates operation with a welcome screen to indicate "power on" status while the internal circuitry is reset and stabilized. The welcome screen allows user to select one of two options. The left button [206] is depressed if the user wants to input tank size, implement size, or groundspeed calibration information. The right button [210] is depressed if no further information is needed to be inputted or changed from the previous use.

If the left button [206] is depressed, corresponding to the word "SETUP" on the bottom row of the liquid crystal display [212] on the welcome screen, the display module

[200] prompts user to input the current size of the anhydrous ammonia tank in gallons. The display module [200] displays the current value for the tank size. If the tank size that is displayed is correct, the user depresses the center button [208] to accept the current tank size. If, however, the tank size needs to be modified, the user may use the left [206] and right [210] buttons to decrease or increase the tank size respectively. When the correct tank size is being displayed, the user depresses the center button [208] to accept the newly modified tank size. This process is repeated in a similar fashion to input the width of the field implement.

The user may, at the conclusion of the tank size and implement size setup screens, enter a mode by which the groundspeed radar system may be calibrated. The user depresses the left button [206], which corresponds to "START" and then drives the tractor the distance specified on the display module [200], suitably 200 feet. Once the specified distance has been covered, the user depresses the right button [210], which corresponds with "FINISH." The display module [200] now has an absolute distance by which it can calibrate its interface with the groundspeed electronics, and this calibration is stored for future use when display module is in monitoring mode. The user may cancel the calibration routine at any time by depressing the center button [208], which corresponds with "CANCEL."

Once the display module [200] is suitably setup with proper tank size, field implement size and groundspeed calibration, the display module switches into the monitoring mode. The user may use the left [206] and the right [210] function keys to scroll through the various display screen options. Suitably, there may be four screens: a screen that simply displays fluid level with a corresponding numerical and bar graph output, a screen that displays the flow rate of fluid and the corresponding estimated time until tank is empty, a screen that indicates the application rate per acre, and a screen that verifies inputted tank size and the amount of fluid remaining in an absolute unit, such as gallons. The number of information screens in not limited to these, however, and may also include screens that indicate total acreage covered, the current ground speed of the tractor, the date and time, a plurality of error messages indicating status of tank module or other electronics, tank empty alerts, burst hose or other messages indicating excessive flow rates that are not anticipated, the internal battery level of either the display module or the tank module, the relative error associated with application rate per acre or other information presented, a summary screen showing all current constants such as current field implement width or current tank size, the total quantity dispensed using the system in current season, the total number of acres covered in the current season, and a total cumulative average application rate per acre in the current season.

Example 2

Determination of Fluid Level Compensation Due to Pitch and Roll

The tank module [40] is capable of measuring both pitch and roll measurements of the tank's [12] angle of incidence relative to the ground plane by means of a 2-axis electronic inclinometer [60]. Since most internal gauge mechanisms are mounted axially within the field tank [12], the pitch of the field tank [12] will have by far the largest effect on possible measurement errors associated with uneven terrain, as opposed to roll which would be encountered frequently in contour farming and does not have a significant effect on float position. The tank module [40] compensates for erroneous float positions due to pitch inclines or declines by combining the information from the electronic inclinometer [60] with the current averaged fluid level.

Figure 23:
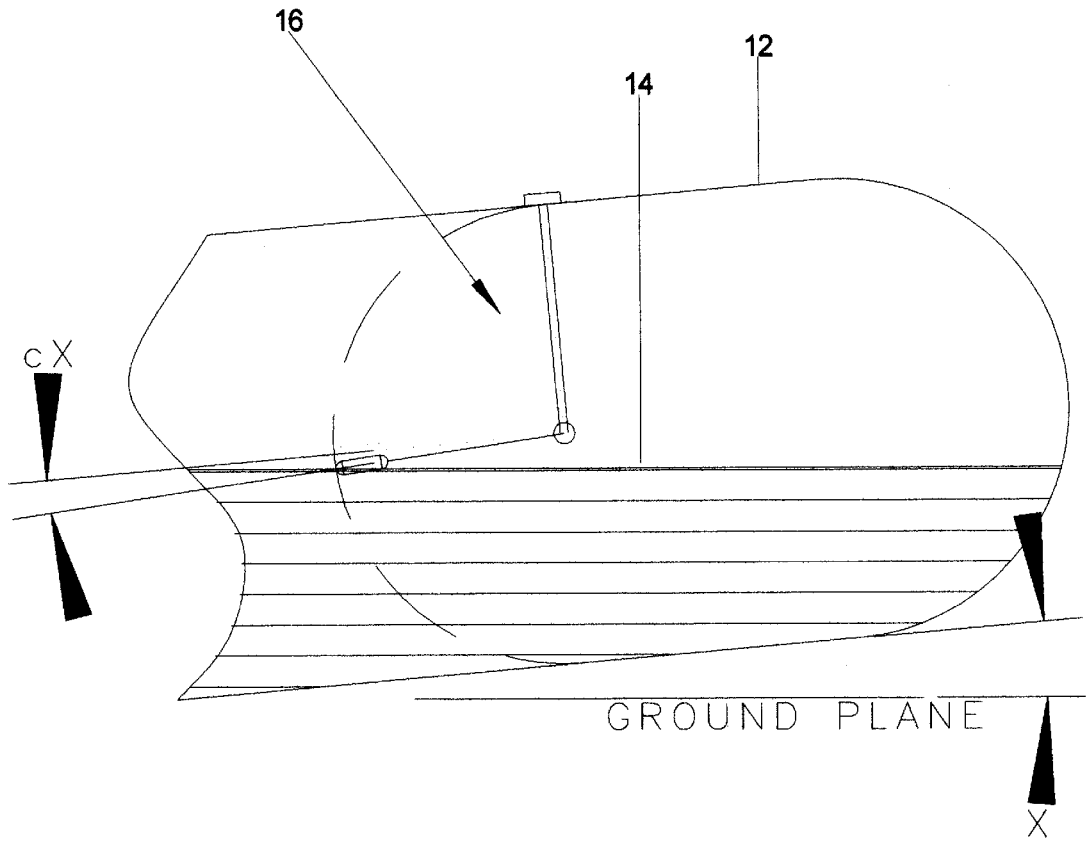
FIG. 23 is a side, cutaway view of a tank at an incline.

FIG. 23 details a fluid containing tank on an incline. As the tank goes up a hill, for instance, the inclinometer [60] will measure the angle of the field tank relative to the ground plane. This pitch angle [angle X] is proportional to the error in the float arm position [angle cX]. The relative effect a given incline or decline will have on the error in the float position is highly dependant upon the amount of fluid remaining in the tank. For an incline, for instance, any given incline angle will have a much more profound effect on float position error for a mostly empty tank than a mostly full tank. Fortunately, however, this behavior is perfectly consistent and predicable, and therefore, information in the form of a look-up table of conversion equation may be stored in the tank module's memory. The angle of tilt defines a coefficient, "c" that is multiplied by the inclinometer [60] reading [angle X] to compensate for the difference in float arm position. The angular difference in float arm position can then be directly correlated to the assumed error in the magnetic field reading using the preinstalled gear ratio information between float arm position and permanent magnet position. The resulting calculated error at the permanent magnet is then simply added or subtracted from the actual reading, and therefore, a compensated fluid level is found.

Example 3

Determination of "Sleep Time" Between Fluid Level Readings

The microcontroller varies the amount of time it sleeps between fluid level samples depending on the amount of fluid remaining in the tank as a means to conserve battery power, while enhancing performance and accuracy of fluid level measurements.

It is known, based on the cylindrical geometry of the tank, that for any given flow rate of fluid from the field tank, that the rate of movement of the float arm will be greater at the upper and lower portions of the tank than it will be in the mid-section. This is because most of the volume of the tank is contained within the mid-section of the tank, so there is a smaller change in fluid level for any given quantity of fluid dispensed. The sampling rate, or duration of time that the microcontroller "sleeps" between samples, is selected from a look-up table within the tank module's onboard memory. Suitably, ten different sample periods are available to the microcontroller depending on the fluid level remaining within the tank. The sleep time periods utilized in the present invention are delineated in Table 1.

TABLE 1

| Fluid Level | Sleep Time |
| --- | --- |
| 90–100% | 5 sec |
| 80–90% | 10 sec |
| 70–80% | 15 sec |
| 60–70% | 20 sec |
| 50–60% | 25 sec |
| 40–50% | 25 sec |
| 30–40% | 20 sec |
| 20–30% | 15 sec |
| 10–20% | 10 sec |
| 0–10% | 5 sec |

While the present invention has now been described and exemplified with some specificity, those skilled in the art will appreciate the various modifications, including variations, additions, and omissions, that may be made in what has been described. Accordingly, it is intended that these modifications also be encompassed by the present invention and that the scope of the present invention be limited solely by the broadest interpretation that lawfully can be accorded the appended claims.

What is claimed is:

1. A fluid level detection system for use with a pressurized tank containing a fluid, comprising:
    a tank module means for detecting the fluid level within the tank and displaying the fluid level information, the tank module means comprising:
        a magnetic sensing means for determining an angular position of a magnetic field of a magnet from a magnetic float gauge assembly connected to the tank and transmitting the angular position;
        a microcontroller means for receiving the angular position information transmitted by the magnetic sensing means and translating it to a fluid level value that corresponds to a percentage of fluid remaining in the tank, and transmitting the fluid level value;
        a display means which receives the fluid level value transmitted by the microcontroller means and displays the fluid level value;
        a housing means for enclosing the magnetic sensing means, microcontroller means, and display means;
    wherein the tank module means is mounted to a gauge of the magnetic float gauge assembly; and
    wherein the tank module means further comprises an electronic inclinometer means for determining the angular orientation of the tank, and transmitting the angular orientation to the tank module microcontroller means, wherein the tank module microcontroller further receives the angular orientation from the inclinometer means, and calculates the fluid level value to a corrected fluid level value.

2. The fluid level detection system of claim 1, wherein the tank module means further comprises an attachment means for attaching the tank module means to the gauge without physically modifying the gauge.

3. The fluid level detection system of claim 2, wherein the attachment means is attached to the gauge without interfering with the operation of the gauge.

4. The fluid level detection system of claim 1, wherein the tank module microcontroller means calculates the fluid level value that corresponds to the percentage of fluid remaining in the tank, regardless of the orientation of the mounted tank module means with respect to the gauge.

5. A remote fluid level detection system for use with a pressurized tank containing a fluid, comprising:
    a tank module means for detecting a fluid level within the tank and transmitting the fluid level information; and
    a display module means for receiving the fluid level information transmitted by the tank module means, and displaying the fluid level information;
    the tank module means comprising;
        a magnetic sensing means for determining an angular position of a magnetic field of a magnet from a magnetic float gauge assembly connected to the tank and transmitting the angular position;
        a microcontroller means for receiving the angular position information transmitted by the magnetic sensing means and translating it to a fluid level value that corresponds to a percentage of fluid remaining in the tank, and transmitting the fluid level value;
        a radio transmitting means for receiving the fluid level value from the tank module microcontroller means, and broadcasting the fluid level value;
        a battery means for powering the magnetic sensing means, tank module microcontroller means, and radio transmitting means;
        a housing means for enclosing the battery means, the magnetic sensing means, tank module microcontroller means, and radio transmitting means; the tank module means being mounted to a gauge of a magnetic float gauge assembly;
    the display module means comprising;
        a radio receiving means for receiving the broadcast fluid level value from the radio transmitting means and transmitting the fluid level value;
        a microcontroller means for receiving the fluid level value from the radio receiving means and transmitting the fluid level value to a display means which displays the fluid level value;
        a battery means for powering the radio receiving means, the display module microcontroller means, and the display means;
        a housing means for enclosing the display module battery means, the radio receiving means, the display module microcontroller means, and the display means; and
    wherein the tank module means further comprises an electronic inclinometer means for determining the angular orientation of the tank, and transmitting the angular orientation to the tank module microcontroller means, wherein the tank module microcontroller means receives the angular orientation from the inclinometer means, and calculates the fluid level value to a corrected fluid level value.

6. The remote fluid level detection system of claim 5, wherein the tank module means further comprises an attachment means for attaching the tank module means to the gauge without physically modifying the gauge.

7. The remote fluid level detection system of claim 6, wherein the attachment means is attached to the gauge without interfering with the operation of the gauge.

8. The remote fluid level detection system of claim 5, wherein the tank module microcontroller calculates the fluid level value that corresponds to the percentage of fluid remaining in the tank, regardless of the orientation of the mounted tank module means with respect to the gauge.

9. The remote fluid level detection system of claim 5, wherein the tank module microcontroller further stores a number of calculated fluid level values.

10. The remote fluid level detection system of claim 9, wherein the tank module microcontroller means further calculates an average fluid level value from a predetermined number of stored fluid level values.

11. The remote fluid level detection system of claim 5, wherein the tank module means continuously detects and transmits the fluid level to the display module means.

12. The remote fluid level detection system of claim 5, wherein the display module means displays the fluid level information continuously.

13. A remote fluid level detection system for use with a pressurized tank containing a fluid, comprising:
    a tank module means for detecting a fluid level within the tank and transmitting the fluid level information; and
    a display module means for receiving the fluid level information transmitted by the tank module means, and displaying the fluid level information;
    the tank module means comprising:
        a magnetic sensing means for determining an angular position of a magnetic field of a magnet from a magnetic float gauge assembly connected to the tank and transmitting the angular position;

a microcontroller means for receiving the angular position information transmitted by the magnetic sensing means and translating it to a fluid level value that corresponds to a percentage of fluid remaining in the tank, and transmitting the fluid level value;

a radio transmitting means for receiving the fluid level value from the tank module microcontroller means, and broadcasting the fluid level value;

a battery means for powering the magnetic sensing means, tank module microcontroller means, and radio transmitting means;

a housing means for enclosing the battery means, the magnetic sensing means, tank module microcontroller means, and radio transmitting means;

the tank module means being mounted to a gauge of a magnetic float gauge assembly;

the display module means comprising;

a radio receiving means for receiving the broadcast fluid level value from the radio transmitting means and transmitting the fluid level value;

a microcontroller means for receiving the fluid level value from the radio receiving means and transmitting the fluid level value to a display means which displays the fluid level value;

a battery means for powering the radio receiving means, the display module microcontroller means, and the display means;

a housing means for enclosing the display module battery means, the radio receiving means, the display module microcontroller means, and the display means; and wherein the display module means further comprises an audio means for emitting an audible warning.

14. The remote fluid level detection system of claim 13, wherein the display module microcontroller further receives and stores a warning fluid level value such that if the display module microcontroller means calculates a fluid level value below the warning fluid level value, the display module microcontroller signals the audio means to emit an audible warning.

15. A remote fluid level detection system for use with a pressurized tank containing a fluid, comprising:

a tank module means for detecting a fluid level within the tank and transmitting the fluid level information; and a display module means for receiving the fluid level information transmitted by the tank module means, and displaying the fluid level information;

the tank module means comprising:

a magnetic sensing means for determining an angular position of a magnetic field of a magnet from a magnetic float gauge assembly connected to the tank and transmitting the angular position;

a microcontroller means for receiving the angular position information transmitted by the magnetic sensing means and translating it to a fluid level value that corresponds to a percentage of fluid remaining in the tank, and transmitting the fluid level value;

a radio transmitting means for receiving the fluid level value from the tank module microcontroller means, and broadcasting the fluid level value;

a battery means for powering the magnetic sensing means, tank module microcontroller means, and radio transmitting means;

a housing means for enclosing the battery means, the magnetic sensing means, tank module microcontroller means, and radio transmitting means;

the tank module means being mounted to a gauge of a magnetic float gauge assembly;

the display module means comprising:

a radio receiving means for receiving the broadcast fluid level value from the radio transmitting means and transmitting the fluid level value;

a microcontroller means for receiving the fluid level value from the radio receiving means and transmitting the fluid level value to a display means which displays the fluid level value;

a battery means for powering the radio receiving means, the display module microcontroller means, and the display means;

a housing means for enclosing the display module battery means, the radio receiving means, the display module microcontroller means, and the display means; and wherein the display module further comprises a tractor ground speed connector means for connecting and receiving tractor ground speed information from a tractor ground speed indicator and transmitting the tractor ground speed information to the display module microcontroller means.

16. The remote fluid level detection system of claim 15 wherein the display module microcontroller means further calculates an average application rate of the fluid from the tank.

17. The remote fluid level detection system of claim 15, wherein the display module microcontroller further signals the audio means to emit an audible warning when the rate of application is over a certain limit.

18. The remote fluid level detection system of claim 15, wherein the display module microcontroller further calculates a total acreage coverage of liquid dispensed from the tank.

19. The remote fluid level detection system of claim 15, wherein the fluid is anhydrous ammonia.

20. The remote fluid level detection system of claim 1 wherein the tank module housing is mounted by the attachment band over a gauge of a magnetic float gauge assembly.

21. The remote fluid level detection system of claim 1 wherein the tank module is mounted to the gauge without interfering with the operation of the gauge.

22. A remote fluid level detection system for use with a pressurized towed tank comprising:

a tank module comprising a housing, a magnetic sensor, a microcontroller, a battery, an attachment band, and an RF transmitter;

a display module comprising a housing, a microcontroller, a display, and an RF receiver;

wherein the tank module housing encloses the tank module microcontroller, magnetic sensor, tank module battery, and RF transmitter, and is attached to the attachment band;

wherein the magnetic sensor, tank module battery, and RF transmitter are each connected to the tank module microcontroller;

wherein the display module housing encloses the display module microcontroller, display module display, and the RF receiver;

wherein the display module display and the RF receiver are each connected to the display module microcontroller; and wherein the tank module further comprises a momentary switch which protrudes through an aperture in the tank module housing and is connected to the tank module microcontroller.

23. The remote fluid level detection system of claim 1 wherein the tank module further comprises a display which is connected to the tank module microcontroller.

24. A remote fluid level detection system for use with a pressurized towed tank comprising:
- a tank module comprising a housing, a magnetic sensor, a microcontroller, a battery, an attachment band, and an RF transmitter;
- a display module comprising a housing, a microcontroller, a display, and an RF receiver;
- wherein the tank module housing encloses the tank module microcontroller, magnetic sensor, tank module battery, and RF transmitter; and is attached to the attachment band;
- wherein the magnetic sensor, tank module battery, and RF transmitter are each connected to the tank module microcontroller;
- wherein the display module housing encloses the display module microcontroller, display module display, and the RF receiver;
- wherein the display module display and the RF receiver are each connected to the display module microcontroller; and
- wherein the tank module further comprises an electronic inclinometer which is connected to the tank module microcontroller.

25. A remote fluid level detection system for use with a pressurized towed tank comprising:
- a tank module comprising a housing, a magnetic sensor, a microcontroller, a battery; an attachment band, and an RF transmitter;
- a display module comprising a housing, a microcontroller, a display, and an RF receiver;
- wherein the tank module housing encloses the tank module microcontroller, magnetic sensor, tank module battery, and RF transmitter, and is attached to the attachment band;
- wherein the magnetic sensor, tank module battery, and RF transmitter are each connected to the tank module microcontroller;
- wherein the display module housing encloses the display module microcontroller, display module display, and the RF receiver;
- wherein the display module display and the RF receiver are each connected to the display module microcontroller; and
- wherein the display module further comprises an input button which protrudes through a first aperture in the display module housing and is connected to the display module microcontroller.

26. The remote fluid level detection system of claim 25, wherein the display module further comprises an audio transducer which is connected to the display module microcontroller.

27. The remote fluid level detection system of claim 25, wherein the display module further comprises a battery unit, housed within the display module housing, and connected to the display module microcontroller.

28. The remote fluid level detection system of claim 25, wherein the display module further comprises a power supply input which protrudes through a third aperture in the display module housing and is connected to the display module microcontroller.

29. The remote fluid level detection system of claim 25, wherein the display module further comprises a tractor ground speed input which protrudes through a fourth aperture in the display module housing and is connected to the display module microcontroller.

30. A remote fluid level detection system for use with a pressurized towed tank comprising:
- a tank module comprising a housing, a magnetic sensor, a microcontroller, a battery, an attachment band, an RF transmitter, an electronic inclinometer, and a display; and
- a display module comprising a housing, a microcontroller, a display, an RF receiver, and an audio transducer;
- wherein the tank module housing encloses the tank module microcontroller, magnetic sensor, tank module battery, RF transmitter; electronic inclinometer, and tank module display; and is connected to the attachment band;
- wherein the magnetic sensor, tank module battery, RF transmitter, tank module display, and electronic inclinometer are each connected to the tank module microcontroller;
- wherein the display module housing encloses the display module microcontroller, display module display, RF receiver, and audio transducer; and
- wherein the display module display, RF receiver, and audio transducer are each connected to the display module microcontroller; and
- wherein the tank module housing is mounted over a gauge of a magnetic float gauge assembly without interfering with the operation of the gauge.

31. The remote fluid level detection system of claim 30 wherein the tank module is mounted to the gauge without interfering with the operation of the gauge.

32. The remote fluid level detection system of claim 30, wherein the display module further comprises a tractor ground speed input which protrudes through an aperture in the display module housing and is connected to the display module microcontroller.

33. A method of detecting and displaying the level of anhydrous ammonia remaining in a pressurized tank using the remote fluid level detection system of claim 30, comprising:
- detecting, by the use of the magnetic sensor, the angular position of a magnetic field of a magnet from the magnetic float gauge assembly connected to the tank; and
- transmitting the angular position of the magnetic field detected by the magnetic sensor to the tank module microcontroller;
- determining the anhydrous ammonia level remaining in the tank by the use of the tank module microcontroller, based on the angular position of the magnetic field detected; and
- displaying the anhydrous ammonia level remaining in the tank on the tank module display connected to the microcontroller.

34. A method of remote detection and display of anhydrous ammonia remaining in a pressurized tank using the remote fluid level detection system of claim 30, comprising:
- detecting, by the use of the magnetic sensor, the angular position of a magnetic field of a magnet from the magnetic float gauge assembly connected to the tank; and
- transmitting the angular position of the magnetic field detected by the magnetic sensor to the tank module microcontroller;

determining the anhydrous ammonia level remaining in the tank by the use of the tank module microcontroller, based on the angular position of the magnetic field detected;

transmitting the anhydrous ammonia level determined by the tank module microcontroller to the display module microcontroller by the use of a radio frequency transmission; and displaying the anhydrous ammonia level remaining in the tank on the display module display connected to the display module microcontroller.

35. A method of determining the application rate of anhydrous ammonia from a pressurized tank using the remote fluid level detection system of claim 30, comprising:

detecting, by the use of the magnetic sensor, a first angular position of a magnetic field of a magnet from the magnetic float gauge assembly connected to the tank;

transmitting the first angular position of the magnetic field detected by the magnetic sensor to the tank module microcontroller;

determining a first anhydrous ammonia level remaining in the tank by the use of the tank module microcontroller, based on the first angular position of the magnetic field detected;

transmitting the first anhydrous ammonia level determined by the tank module microcontroller to the display module microcontroller by the use of a radio frequency transmission;

storing the first anhydrous ammonia level in the display module microcontroller;

waiting a predetermined period of time before a second angular position of the magnetic field is detected by the magnetic sensor;

detecting, by the use of an electronic magnetic sensor, a second angular position of a magnetic field of a magnet from a magnetic float gauge assembly connected to the tank;

transmitting the second angular position of the magnetic field detected by the magnetic sensor to the tank module microcontroller;

determining a second anhydrous ammonia level remaining in the tank by the use of the tank module microcontroller, based on the second angular position of the magnetic field detected;

transmitting the second anhydrous ammonia level determined by the tank module microcontroller to the display module microcontroller by the use of a radio frequency transmission;

storing the second anhydrous ammonia level in the display module microcontroller;

determining the period of time between the obtained of first anhydrous ammonia level and the second anhydrous ammonia level by the use of the microcontroller; and determining the application rate of anhydrous ammonia by the use of the microcontroller.

36. The method of claim 35, wherein a warning application rate is set in the display module microcontroller, wherein the microcontroller signals an audio transducer to emit an audible signal if the application rate of anhydrous ammonia goes above the warning application rate.

37. The method of claim 35, wherein the display module microcontroller further calculates an estimated time at which the anhydrous ammonia level will reach zero.

38. A method of detecting and displaying the level of anhydrous ammonia remaining in a pressurized tank using a remote fluid level detection system comprising a tank module means for detecting a fluid level within the tank and transmitting the fluid level information; and a display module means for receiving the fluid level information transmitted by the tank module means, and displaying the fluid level information;

the tank module means comprising:
  a magnetic sensing means for determining an angular position of a magnetic field of a magnet from a magnetic float gauge assembly connected to the tank and transmitting the angular position;
  a microcontroller means for receiving the angular position information transmitted by the magnetic sensing means and translating it to a fluid level value that corresponds to a percentage of fluid remaining in the tank, and transmitting the fluid level value;
  a radio transmitting means for receiving the fluid level value from the tank module microcontroller means, and broadcasting the fluid level value;
  a housing means for enclosing the magnetic sensing means, tank module microcontroller means, and radio transmitting means;
  the tank module means being mounted to a gauge of a magnetic float gauge assembly;

the display module means comprising:
  a radio receiving means for receiving the broadcast fluid level value from the radio transmitting means and transmitting the fluid level value;
  a microcontroller means for receiving the fluid level value from the radio receiving means and transmitting the fluid level value to a display means which displays the fluid level value;
  a housing means for enclosing the radio receiving means, the display module microcontroller means, and the display means;

the steps comprising:
  detecting, by the use of the magnetic sensor, the angular position of a magnetic field of a magnet from the magnetic float gauge assembly connected to the tank; and
  transmitting the angular position of the magnetic field detected by the magnetic sensor to the tank module microcontroller;
  determining the anhydrous ammonia level remaining in the tank by the use of the tank module microcontroller, based on the angular position of the magnetic field detected; and
  displaying the anhydrous ammonia level remaining in the tank on the tank module display connected to the microcontroller.

39. A method of remote detection and display of anhydrous ammonia remaining in a pressurized tank using a remote fluid level detection system comprising a tank module means for detecting a fluid level within the tank and transmitting the fluid level information; and a display module means for receiving the fluid level information transmitted by the tank module means, and displaying the fluid level information;

the tank module means comprising:
  a magnetic sensing means for determining an angular position of a magnetic field of a magnet from a magnetic float gauge assembly connected to the tank and transmitting the angular position;
  a microcontroller means for receiving the angular position information transmitted by the magnetic sensing means and translating it to a fluid level value that corresponds to a percentage of fluid remaining in the tank, and transmitting the fluid level value;

a radio transmitting means for receiving the fluid level value from the tank module microcontroller means, and broadcasting the fluid level value;

a housing means for enclosing the magnetic sensing means, tank module microcontroller means, and radio transmitting means; the tank module means being mounted to a gauge of a magnetic float gauge assembly;

the display module means comprising:

a radio receiving means for receiving the broadcast fluid level value from the radio transmitting means and transmitting the fluid level value;

a microcontroller means for receiving the fluid level value from the radio receiving means and transmitting the fluid level value to a display means which displays the fluid level value;

a housing means for enclosing the radio receiving means, the display module microcontroller means, and the display means;

the steps comprising:

detecting, by the use of the magnetic sensor, the angular position of a magnetic field of a magnet from the magnetic float gauge assembly connected to the tank; and transmitting the angular position of the magnetic field detected by the magnetic sensor to the tank module microcontroller;

determining the anhydrous ammonia level remaining in the tank by the use of the tank module microcontroller, based on the angular position of the magnetic field detected;

transmitting the anhydrous ammonia level determined by the tank module microcontroller to the display module microcontroller by the use of a radio frequency transmission; and displaying the anhydrous ammonia level remaining in the tank on the display module display connected to the display module microcontroller.

40. A method of determining the application rate of anhydrous ammonia from a pressurized tank using the remote fluid level detection system comprising a tank module means for detecting a fluid level within the tank and transmitting the fluid level information; and a display module means for receiving the fluid level information transmitted by the tank module means, and displaying the fluid level information;

the tank module means comprising:

a magnetic sensing means for determining an angular position of a magnetic field of a magnet from a magnetic float gauge assembly connected to the tank and transmitting the angular position;

a microcontroller means for receiving the angular position information transmitted by the magnetic sensing means and translating it to a fluid level value that corresponds to a percentage of fluid remaining in the tank, and transmitting the fluid level value;

a radio transmitting means for receiving the fluid level value from the tank module microcontroller means, and broadcasting the fluid level value;

a housing means for enclosing the magnetic sensing means, tank module microcontroller means, and radio transmitting means; the tank module means being mounted to a gauge of a magnetic float gauge assembly;

the display module means comprising:

a radio receiving means for receiving the broadcast fluid level value from the radio transmitting means and transmitting the fluid level value;

a microcontroller means for receiving the fluid level value from the radio receiving means and transmitting the fluid level value to a display means which displays the fluid level value;

a housing means for enclosing the radio receiving means, the display module microcontroller means, and the display means;

the steps comprising:

detecting, by the use of the magnetic sensor, a first angular position of a magnetic field of a magnet from the magnetic float gauge assembly connected to the tank;

transmitting the first angular position of the magnetic field detected by the magnetic sensor to the tank module microcontroller;

determining a first anhydrous ammonia level remaining in the tank by the use of the tank module microcontroller, based on the first angular position of the magnetic field detected;

transmitting the first anhydrous ammonia level determined by the tank module microcontroller to the display module microcontroller by the use of a radio frequency transmission;

storing the first anhydrous ammonia level in the display module microcontroller;

waiting a predetermined period of time before a second angular position of the magnetic field is detected by the magnetic sensor;

detecting, by the use of an electronic magnetic sensor, a second angular position of a magnetic field of a magnet from a magnetic float gauge assembly connected to the tank;

transmitting the second angular position of the magnetic field detected by the magnetic sensor to the tank module microcontroller;

determining a second anhydrous ammonia level remaining in the tank by the use of the tank module microcontroller, based on the second angular position of the magnetic field detected;

transmitting the second anhydrous ammonia level determined by the tank module microcontroller to the display module microcontroller by the use of a radio frequency transmission;

storing the second anhydrous ammonia level in the display module microcontroller;

determining the period of time between the obtained of first anhydrous ammonia level and the second anhydrous ammonia level by the use of the microcontroller; and determining the application rate of anhydrous ammonia by the use of the microcontroller.

41. The method of claim 40, wherein the display module microcontroller further calculates an estimated time at which the anhydrous ammonia level will reach zero.

* * * * *